US007046326B2

(12) United States Patent
Austin et al.

(10) Patent No.: US 7,046,326 B2
(45) Date of Patent: May 16, 2006

(54) MULTI-PIXEL LIQUID CRYSTAL CELL ARRAY

(75) Inventors: Lindsay W. Austin, Santa Rosa, CA (US); Shanti A. Cavanaugh, Santa Rosa, CA (US); Louis J. Molinari, Windsor, CA (US); Mark E. Young, Santa Rosa, CA (US)

(73) Assignee: Xtellus, Inc., Morris Plains, NJ (US)

( * ) Notice: Subject to any disclaimer, the term of this patent is extended or adjusted under 35 U.S.C. 154(b) by 0 days.

(21) Appl. No.: 10/391,510

(22) Filed: Mar. 17, 2003

(65) Prior Publication Data

US 2004/0183988 A1    Sep. 23, 2004

Related U.S. Application Data

(63) Continuation of application No. 10/371,235, filed on Feb. 21, 2003.

(51) Int. Cl.
*G02F 1/1339* (2006.01)

(52) U.S. Cl. .................. 349/155; 349/156; 349/153

(58) Field of Classification Search ........... 349/155, 349/156, 153
See application file for complete search history.

(56) References Cited

U.S. PATENT DOCUMENTS

| | | | |
|---|---|---|---|
| 3,637,291 A * | 1/1972 | Kessler et al. .............. 349/21 |
| 4,135,789 A | 1/1979 | Hall | |
| 4,148,128 A | 4/1979 | Feldman | |
| 4,165,157 A | 8/1979 | Kobale | |
| 4,310,220 A | 1/1982 | Kuwagaki | |
| 4,315,668 A | 2/1982 | Aftergut | |
| 4,410,238 A | 10/1983 | Hanson | |
| 4,545,650 A | 10/1985 | Kirkman | |
| 4,556,289 A | 12/1985 | Fergason | |
| 4,634,225 A | 1/1987 | Haim | |
| 5,013,140 A | 5/1991 | Healey | |
| 5,015,057 A | 5/1991 | Rumbaugh | |
| 5,088,806 A | 2/1992 | McCartney | |
| 5,276,747 A | 1/1994 | Pan | |
| 5,396,355 A * | 3/1995 | Wada et al. .............. 349/117 |
| 5,414,541 A | 5/1995 | Patel | |
| 5,430,561 A | 7/1995 | Kato | |
| 5,528,402 A | 6/1996 | Parker | |
| 5,724,165 A | 3/1998 | Wu | |
| 5,726,805 A | 3/1998 | Kaushik | |
| 5,727,109 A | 3/1998 | Pan | |
| 5,739,888 A * | 4/1998 | Ogura et al. .............. 349/153 |
| 5,859,728 A | 1/1999 | Colin | |
| 5,877,876 A | 3/1999 | Birdwell | |
| 5,953,087 A | 9/1999 | Hoyt | |

(Continued)

*Primary Examiner*—Kenneth Parker
*Assistant Examiner*—David Chung
(74) *Attorney, Agent, or Firm*—Morrison & Foerster LLP

(57) ABSTRACT

A multi-pixel optical processing system includes a multi-pixel liquid crystal cell platform having a deposited metal gasket moisture barrier bonding two opposing substrates each having a spacer layer to accurately control cell gap thickness. A library of specialized pixel constructs is included that can be configured to yield predetermined optical functions at referential locations in the platform. A control system is provided utilizing a time division scheme that multiplexes temperature sensing and heating functions across an optional integrated active thermal element that may be integrated inside the liquid crystal platform. A calibration process characterizes the profile of the cell and generates a polynomial regression formula that provides the voltage drive output for all pixels in the platform based on the platform temperature and state of each pixel.

7 Claims, 25 Drawing Sheets

U.S. PATENT DOCUMENTS

| | | |
|---|---|---|
| 5,963,291 A | 10/1999 | Wu |
| 6,075,512 A | 6/2000 | Patel |
| 6,094,246 A | 7/2000 | Wong |
| 6,141,076 A | 10/2000 | Liu |
| 6,141,361 A | 10/2000 | Mears |
| 6,166,838 A | 12/2000 | Liu |
| 6,181,846 B1 | 1/2001 | Pan |
| 6,201,593 B1 | 3/2001 | Wong |
| 6,215,928 B1 | 4/2001 | Friesem |
| 6,253,015 B1 | 6/2001 | Ukrainczyk |
| 6,285,478 B1 | 9/2001 | Liu |
| 6,285,500 B1 | 9/2001 | Ranalli et al. |
| 6,323,974 B1 | 11/2001 | Harris et al. |
| 6,353,467 B1 | 3/2002 | Wong |
| 6,356,389 B1 | 3/2002 | Nilsen |
| 6,388,730 B1 | 5/2002 | Lindquist |
| 6,404,538 B1 | 6/2002 | Chen |
| 6,417,948 B1 | 7/2002 | Chowdhury et al. |
| 6,426,816 B1 | 7/2002 | Wu |
| 6,429,962 B1 | 8/2002 | Xu |
| 6,455,841 B1 | 9/2002 | Zhou |
| 6,462,803 B1 * | 10/2002 | Kumagai et al. ........... 349/153 |
| 6,498,680 B1 | 12/2002 | Zhou |
| 6,515,751 B1 | 2/2003 | Craighead et al. |
| 6,519,022 B1 | 2/2003 | Xu |
| 6,603,781 B1 | 8/2003 | Stinson |
| 6,621,580 B1 | 9/2003 | Myatt |
| 2003/0201966 A1 | 10/2003 | Pan |

* cited by examiner

FIGURE 3C
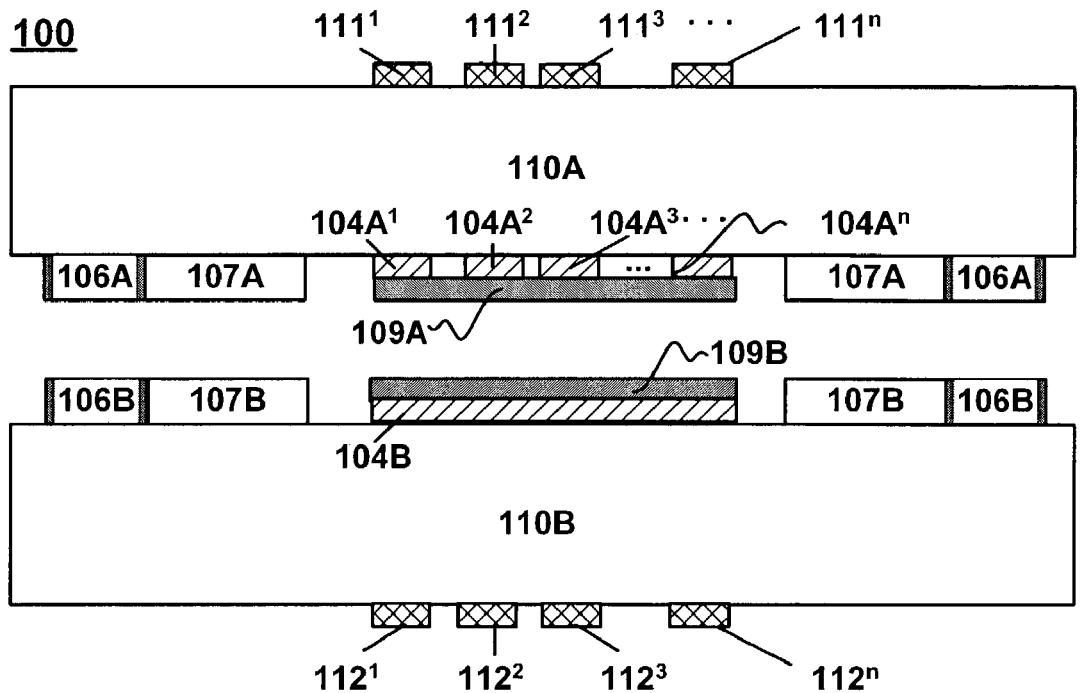
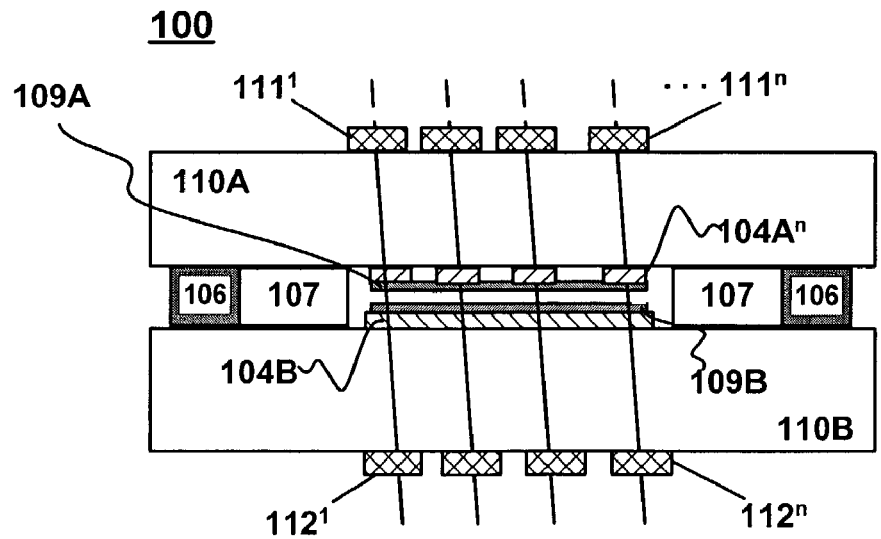
FIGURE 3D

FIGURE 3E
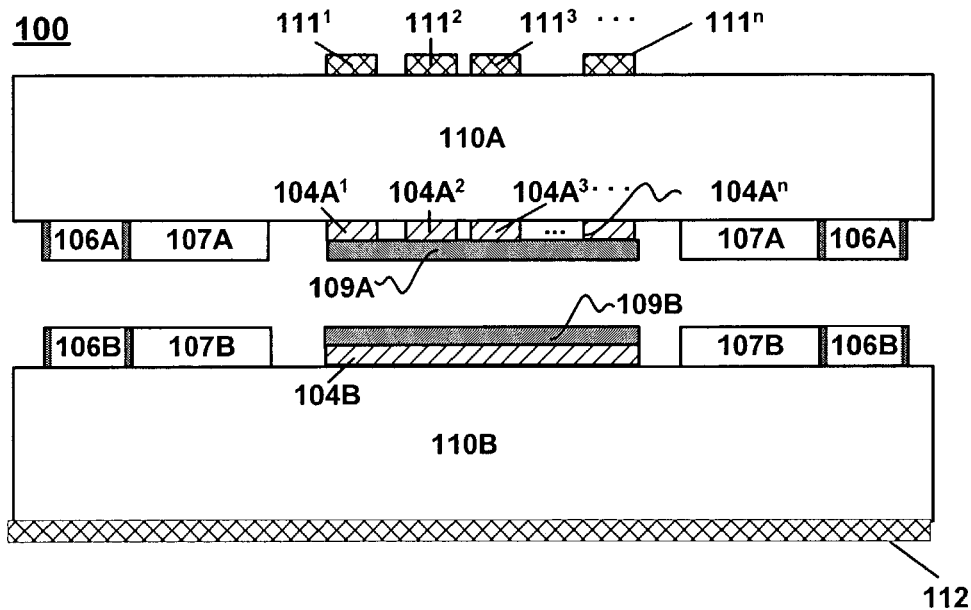
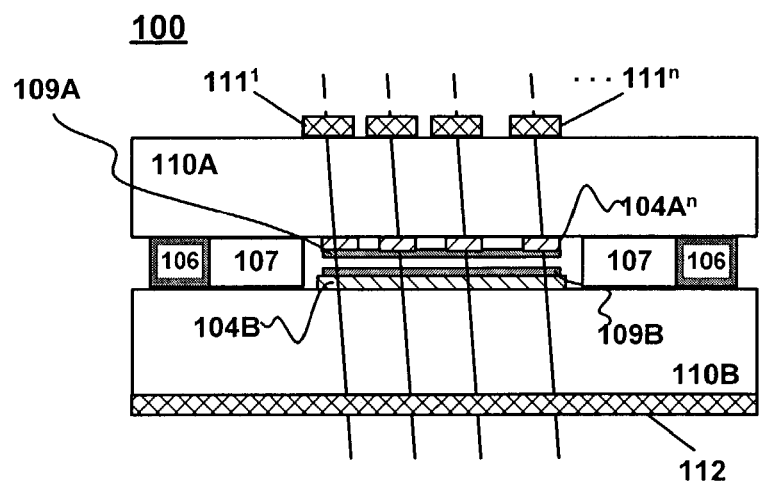
FIGURE 3F

FIGURE 3G
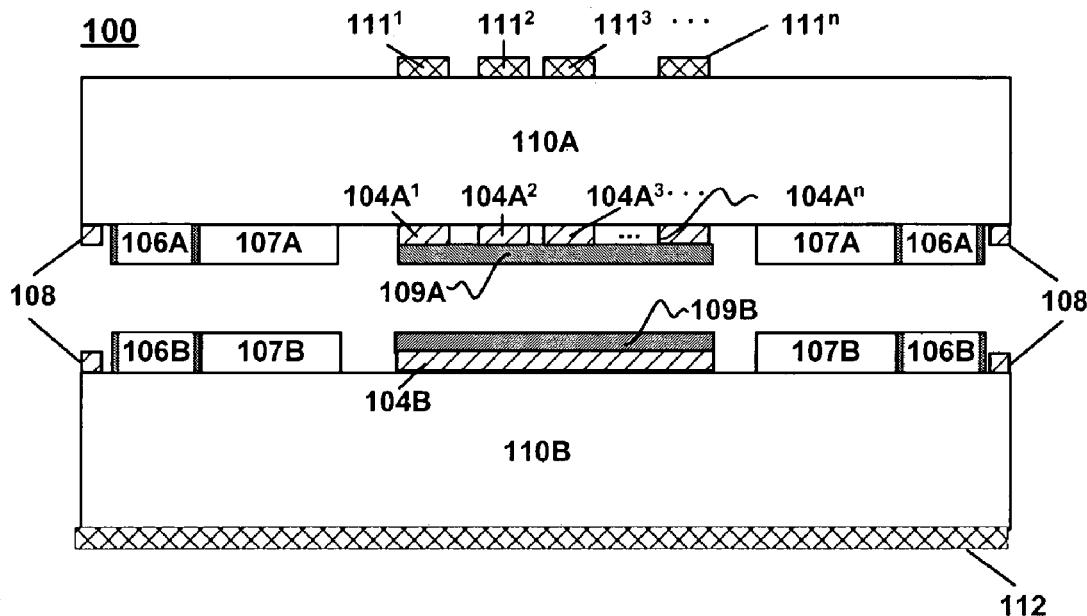
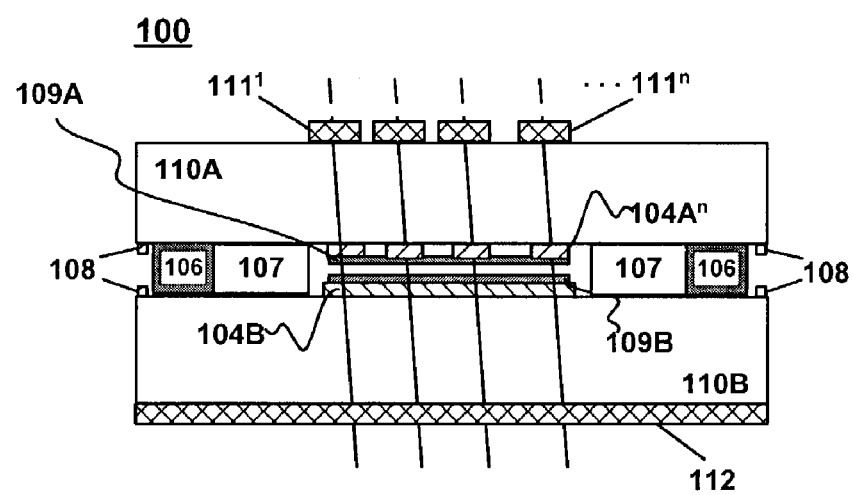
FIGURE 3H

Mirror Pixels

[a]　　　Fixed Rotator Pixels　　　[b]

[c]　　　　　　　　　　　　　　　[d]

[a]     PBS/Combiner Pixels     [b]

MULTI-PIXEL LIQUID CRYSTAL CELL ARRAY

CROSS-REFERENCE TO RELATED APPLICATIONS

This application is a continuation of and claims priority from commonly assigned application Ser. No. 10/371235, titled "Liquid Crystal Cell Platform", filed Feb. 21, 2003. This application is also related to the following copending U.S. nonprovisional applications, all of which are herein incorporated by reference; "Fabrication Method for Liquid Crystal Cell", filed Feb. 21, 2003 and having Ser. No. 10/371976, "Thermal Control System for Liquid Crystal Cell", filed Feb. 21, 2003 and having Ser. No. 10/371983, and "Liquid Crystal Variable Optical Attenuator", filed Mar. 3, 2003 and having Ser. No. 10/379384.

FIELD OF INVENTION

This invention relates generally to optical liquid crystal systems. More particularly, it relates to multi-pixel liquid crystal cell platforms.

BACKGROUND OF THE INVENTION

Since the advent of fiber optics, the fiber optical communication infrastructures have become more diverse and sophisticated. The fiber optic applications range from low speed, local area networks to high speed, long distance telecommunication systems. In recent years, the demands for greater bandwidth and lower network costs have resulted in the increased use of arrayed components. For example, non-blocking optical cross connect switches utilize arrayed collimators across input and output ports to align optical paths to arrays of mirrors. Electrically tunable variable optical attenuators are packaged in arrays to provide dynamic rebalancing of individual optical channels. The general popularity of arrayed devices are largely based on wafer level manufacturing processes that result in cost savings over individually packaged components. Arrayed devices also simplify coupling and alignment challenges in constructing the optical system since they often share a common substrate.

Optical nanostructures have been the object of scientific investigation for several years but advances in material science and imprint lithography have only recently resulted in their cost effective manufacturing and availability as packagable array components for industry. An optical nanostructure is derived with feature sizes below the wavelength of light, so each element in the array has uniform behavior over a broad wavelength, wide acceptance angles and unique optical properties by function of varying dimensions of the underlying grating features. Optical nanostructures have been designed to function as wavelength filters, polarizers, polarizing beam splitters, combiners, and waveplates. As a result of their unique optical properties, high performance and miniature form factor, optical nanostructures represent a promising new technology that will have broad ramifications to tomorrow's array-based optical systems.

However, realizing the performance and value of optical nanostructures is tantamount to overcoming the primary challenge of integrating these optical structures into active optical platforms. Nanostructures may be heterogeneously or monolithically integrated with active optical elements, integrated as thin-films placed adjacent to, affixed to, or inserted into other optical components such as lasers, planar lightwave circuits and liquid crystal devices. The challenge of integrating nanostructures with other optical elements and obtaining the extraordinary performance and scale benefits is a serious undertaking given that the integrated structure will carry a performance metric based on the additive sum optical properties of the two individual structures plus any distortion caused by the interface of the nanostructure and active platform. As a result, the performance of integrated structures usually do not offer the same level of high performance provided by the nanostructure alone. There is a strong need, therefore, to increase the performance of the underlying active platform targeted to drive the performance of the optical nanostructure integrated therewith.

Liquid crystal technology is known to be dynamically controlled and configured to enable a range of optical switching and signal conditioning applications. Formed with opposing plates of sealed substrates, liquid crystal cells are considered a prospect technology and integration target capable of supplying the active layer to a nanostructure integrated therewith. Wang et. Al has recently demonstrated an experimental electrically tunable filter based on a waveguide resonant sub-wavelength nanostructure-grating filter incorporating a tuning mechanism in a thin liquid crystal. The device experiment was functional and exhibited performance of 30 nanometer tuning.

It is generally known that the performance of liquid crystal technology is susceptible to temperature and humidity change, and that high humidity and temperature changes cause decreased optical performance, resulting in high insertion loss and low extinction, two critical measures of a cell's performance. More specifically, changes in optical versus electrical response with atmosphere changes generally renders the prior art liquid crystal devices unstable and nonrepeatable.

The speed performance and optical characteristics of the liquid crystal medium as a function of applied electric field varies with temperature. In a liquid crystal cell relatively modest changes in temperature can result in relatively large changes in the polarization rotation of light, index of refraction, and the speed of the liquid crystal state changes. The size and the effect of the change in optical properties are factors in controlling the optical performance in the various states of the liquid crystal cell across temperature.

In order to ensure that the temperature of the liquid crystal medium can provide stable operation and within a practical response time, prior art liquid crystal cells are known to utilize active thermal management systems based on independent temperature sensor and heater elements. Jackson et al. relies on a resistive heating element that can be energized to heat the liquid crystal cell whenever the temperature of the cell drops below a predetermined temperature trip point. Jackson does not accommodate feedback to the voltage control of the cell and fails to handle ambient temperature increases above the trip point. McCartney et al. provides a more complete solution that incorporates the output of the temperature sensor into a temperature feedback loop to adjust voltage in response to temperature change. In this design, a two-dimensional lookup table provides the output voltage for any temperature and pixel attribute combination. McCartney's design, however, does not scale to high resolution optical systems without increasing the size of the lookup table.

In general, the prior art liquid crystal thermal management systems rely on use of individual discreet devices for heating and sensing the liquid crystal cell. These devices are generally affixed to the outside glass of the cell at disparate locations so they are generally incapable of functioning uniformly across the cell. In addition, because these devices are usually affixed to the outside glass, all heating and sensing functions directed to the liquid crystal molecules on the inside of the glass must be translated through the glass medium. This can result in hysterises and other effects that distort the effectiveness of closed loop temperature sensing and heating systems. Finally, prior-art liquid crystal cell heaters and temperature sensors are typically attached to the cell using epoxy resins, and epoxy resins are generally known to absorb moisture in high temperatures and high humidity conditions, which leads to degradation or inconsistency in cell performance.

The performance of liquid crystal cells are generally very sensitive to moisture and humidity. Prior art liquid crystal seals are known to provide varying levels of protection of liquid crystal cells from moisture and humidity. The prior art designs generally seal and space the cell with glass beads, frit and organic polymers such as epoxy resin. Sealing materials are generally disposed, in the form of gaskets, about the periphery of the cell. The advantage of a seal of glass frit is known to be that such seal is practically impervious to gas and vapors, but this approach requires formation by high temperature processing, and high temperature processing tends to distort the substrate and render difficult control uniformity of the distance between the inner surface of the parallel substrates. This gap (containing the liquid crystal material) must be maintained with a high degree of uniformity to achieve precise operation of a liquid crystal cell. Accurately controlling the liquid crystal cell gap is keystone to enabling high performance nanostructured liquid crystal optical systems of the present invention.

In producing an effective glass frit seal, the frit is generally applied to a surface of one of the substrates as a paste of glass powder particles dispersed in a liquid vehicle. The substrate is subsequently heated over a programmed temperature regime wherein, at lower temperatures, the solvent is evaporated and the binder is burned off, and hence in the higher temperature portions of the regime, the glass powder itself melts and coalesces to form a strongly adhesive bond to the glass substrate. Subsequently, the second glass substrate is positioned over the coalesced frit and the entire assembly is again subjected to a programmed temperature regime during which the temperature is raised within a few tens of degrees of the glazing temperature of the glass frit. At this relatively high temperature, the glass frit wets the second substrate to acquire satisfactory adhesion thereto. It is known that this second heating cycle tends to soften the substrates and cause warpage thereof, with the result that cells, particularly those of larger surface area, sealed by this glass frit method tend to have a very low percentage of acceptable manufacture.

It is generally known that warpage during fabrication can be prevented by the alternate use of organic polymer sealants, such as epoxy resins and the like, which can be processed at much lower temperatures. Polymer sealants may be screen printed from a solution or dispersion of the polymer in a solvent, or a polymer sheet can be cut into the shape of a gasket which is sandwiched between the substrates to be sealed, and the sandwich is subsequently heated to effect such seal. It is also known to introduce the polymer along the edges of an assembly of two substrates which are kept otherwise separated by interior spacers. However, such organic polymer sealants have a relatively high permeability to water vapor. Under high temperature and humidity conditions, water vapor permeates into the seal causing the expansion of the seal and a shape change in the liquid crystal cavity that results in a change in the known performance of the liquid crystal cell Given the cost and performance benefits of optical device arrays, the assertion that liquid crystal technology is highly compatible with thin film and imprint lithography, a strong need exists for an improved multi-pixel liquid crystal platform that can be configured in various formats to enable a range of useful optical processing functionality.

FEATURES OF THE INVENTION

The present invention contain several features that may be configured independently or in combination with other features of the present invention, depending on the application and operating configurations. The delineation of such features is not meant to limit the scope of the invention but merely to outline certain specific features as they relate to the present invention.

It is a feature of the present invention to provide a multi-pixel liquid crystal cell platform that may be formed of substrate etched with sub wavelength optical features.

It is a feature of the present invention to provide a multi-pixel liquid crystal cell that may be constructed from materials substantially impervious to moisture.

It is a feature of the present invention to provide a multi-pixel liquid crystal cell that may contain a heater and temperature sensor integrated therein as single physical element and to provide for accurate and uniform control of heating and temperature sensing.

It is a feature of the present invention to provide a multi-pixel liquid crystal cell platform that may be fabricated with at least one integrated optical element that provides global functionality across multiple pixels in the platform.

It is a feature of the present invention to provide a multi-pixel liquid crystal cell platform that may be formed from a substrate integrated with subwavelegth optical grating patterned to perform specific functions across local pixels in the platform.

It is a feature of the present invention to provide a multi-pixel liquid crystal cell platform that may be fabricated with integrated optical elements disposed in a one to one correspondence with pixels of the array.

It is a feature of the present invention to provide a base library of pixel constructs that can be configured into the platform of the present invention to enable pixels that perform specific optical functions.

It is a feature of the present invention to provide a multi-pixel liquid crystal cell platform that can be configured with pixels that perform specific optical functions, including but not limited to attenuation, polarization filtration, wavelength filtering, switching, reflecting, tapping, polarization beam splitting, combining, isolating.

It is a feature of the present invention to provide a base library of pixel constructs that can be interleaved and merged to form new pixels with extended functionality.

It is a feature of the present invention to provide a multi-pixel liquid crystal cell platform that may be fabricated with an integrated polarizer, beam splitter, polarization beam splitter, waveguide, thin film, filter, mirror, partially transparent mirror, photodetector, isolator, grating, subwavelength grating, combiner, waveplate, nanostructure, or some combination thereof.

It is a feature of the present invention to provide a multi-pixel liquid crystal cell that can be configured in various applications, including but not limited to telecommunications applications in optical switching, variable optical attenuation, tunable filters and wavelength selection applications.

It is a feature of the present invention to provide a novel method of operating a multi-pixel liquid crystal cell across a range of temperature without the need for lookup tables otherwise used to compensate for real time temperature changes.

It is a feature of the present invention to provide a multi-pixel liquid crystal cell that passes the strict telecommunications guidelines as outlined in Telcordia GR1221 without the need for hermetic housing.

It is a feature of the present invention to provide an optically flat multi-pixel liquid crystal cell not prone to warpage during fabrication process.

It is a feature of the present invention to provide an optically flat multi-pixel liquid crystal cell not prone to warpage when exposed to various thermal and humidity atmospheres.

It is a feature of the present invention to provide a multi-pixel liquid crystal cell whose thickness may be controlled at nanometer resolution.

It is a feature of the present invention to provide a platform that may be used in an array of transmissive or reflective liquid crystal cells.

SUMMARY OF THE INVENTION

The disadvantages associated with the prior art may be overcome by a multi-pixel liquid crystal cell platform that includes a deposited metal gasket moisture barrier bonding two opposing substrates each having a spacer layer to accurately control cell gap thickness. The multi-pixel liquid crystal cell may include an integrated thermal sensor and heater deposition layer sandwiched between or deposited on at least one or both opposing substrates. A library of specialized pixel constructs is included that can be configured to yield predetermined optical functions at referential locations in the platform.

The disadvantages associated with the prior art may further be overcome with a multi-pixel liquid crystal cell control system utilizing a time division scheme that multiplexes temperature sensing and heating functions across an integrated active thermal element such that the cell may generally be kept at a constant temperature. In addition or in place of heating the cell, a calibration process characterizes the profile of the cell and generates a polynomial regression formula that provides the voltage drive output for all pixels in the platform based on the platform temperature and state of each pixel. The control system stores the state of the liquid crystal cell, the regression formula, and reads the temperature of the liquid crystal cell to compute and assert the temperature compensated voltage drive across the pixel array.

BRIEF DESCRIPTION OF THE FIGURES

FIGS. 3c and 3d show example third embodiment multi-pixel liquid crystal cell platform having integrated optical elements on the first and second substrate that provide an optical function at each local pixel location.

FIGS. 3e and 3f show example third embodiment multi-pixel liquid crystal cell platform having integrated optical elements on the first substrate providing an optical function at each local pixel location and an integrated optical element on the second substrate that provides a global optical function across multiple pixels.

FIGS. 3g and 3h shows the temperature sensor/heating device of the present invention that can be configured across all embodiments of the present invention.

DETAILED DESCRIPTION

Throughout this application, like reference numbers as used to refer to like elements. For instance, the two substrates used to form the liquid crystal cell of the present invention are referred to throughout this applications as 110A and 110B. Those supporting elements and features of the invention that are distributed on each substrate and later combined may be referred to under their index reference for a particular substrate 'A, 'B or for simplicity sake, under the shared reference '.

Figure 1A:
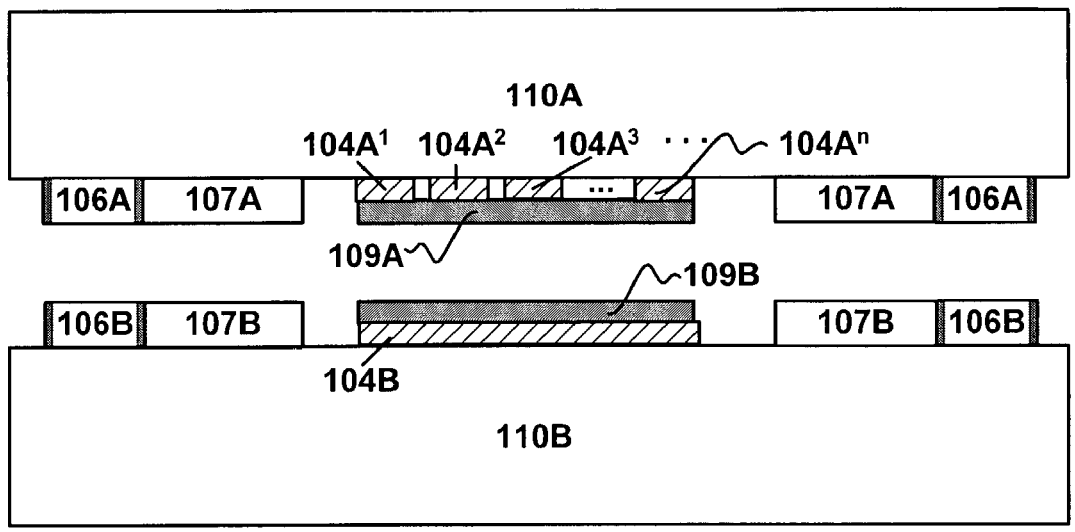
FIGS. 1a and 1b show example first embodiment multi-pixel liquid crystal platforms.
Figure 1B:
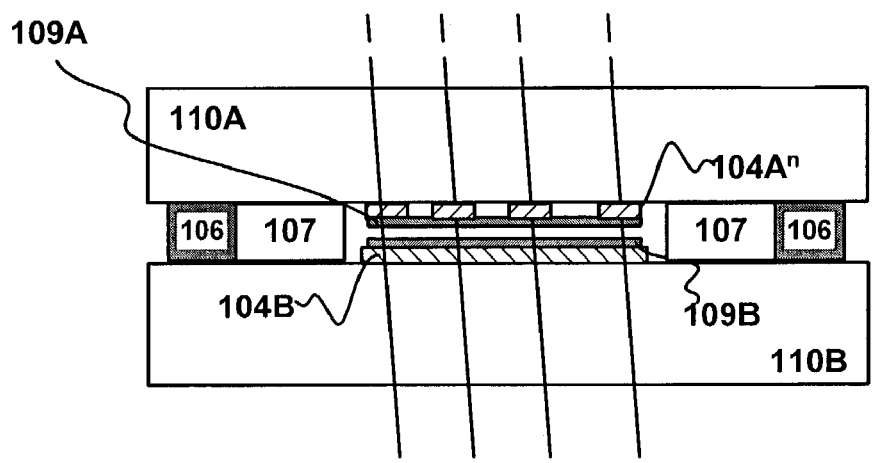

A first embodiment of the present invention is presented in FIGS. 1a and 1b, which shows a multi-pixel liquid crystal cell platform 100 having a first substrate 110A in opposition to a second substrate 110B. In this embodiment, the first substrate may contain an inner surface having a conductive electrode layer 104 patterned to form individual pixel locations $104A^1$ through $104A^n$, liquid crystal alignment layer 109A, a metal gasket element layer 106A and spacer element layer 107A. The second substrate 110B contains an inner surface having a common a conductive electrode layer 104B spanning the pixels defined above, a liquid crystal alignment layer 104B, metal gasket element layer 106B and spacer element layer 107B. In this embodiment and all embodiments, is preferred to maintain a common electrode 104B across multiple pixels in the array since it may form a ground plane common to the array. However, it need be noted that within the scope of this invention it will be clear that a multi-pixel mask similar to that used in the first substrate may also be used to form individual pixel electrodes in electrode layer 104B.

Figure 2A:
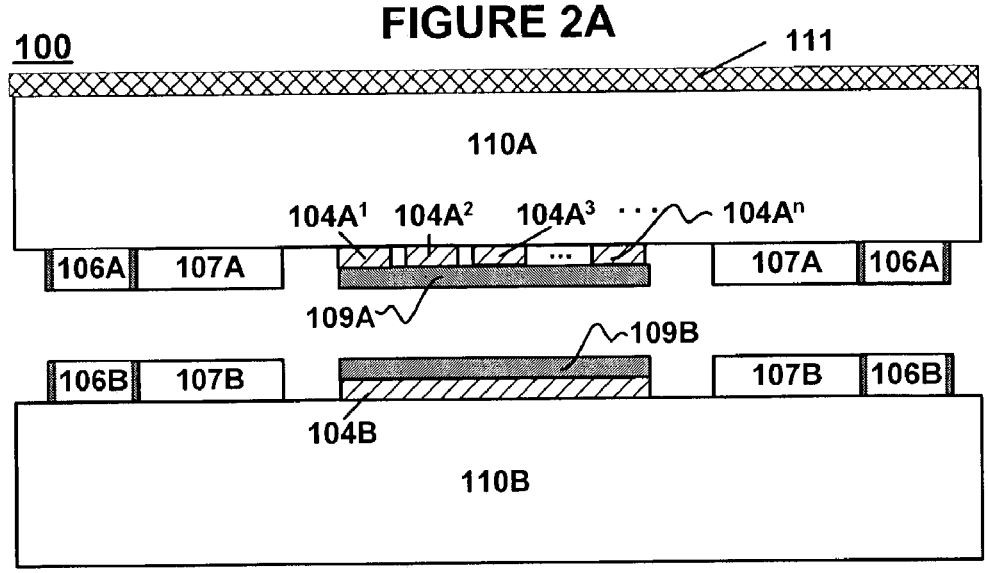
FIGS. 2a and 2b show example second embodiment multi-pixel liquid crystal cell platform having an integrated optical element that functions globally across multiple pixels.
Figure 2B:
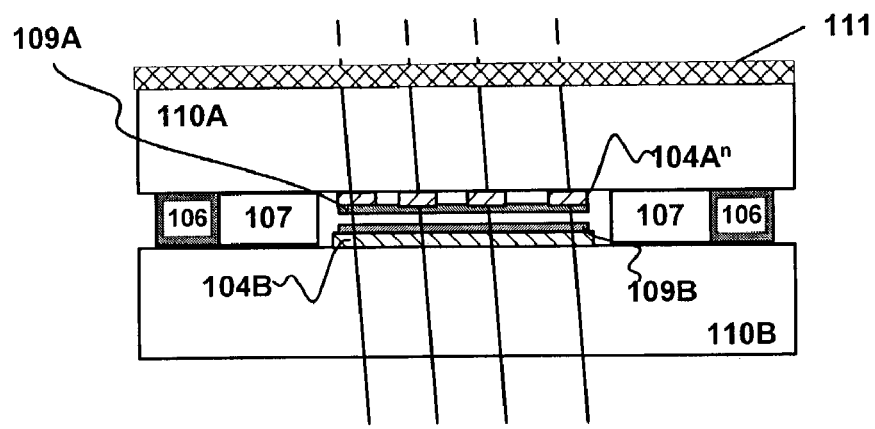

A second embodiment of the present invention includes an integrated optical element 111 and is presented in FIGS. 2a and 2b, which shows a multi-pixel liquid crystal cell platform 100 having a first substrate 110A in opposition to a second substrate 110B wherein the first substrate contains a global integrated optical element 111 on one side of the substrate that performs an optical function across multiple pixel locations, a conductive electrode layer 104 patterned to form individual pixel locations $104A^1$ through $104A^n$, a liquid crystal alignment layer 109A, metal gasket element layer 106A and spacer element layer 107A on the opposing side, and, the second substrate 110B containing a common conductive electrode layer 104B spanning the pixels defined above, a liquid crystal alignment layer 109B, metal gasket element layer 106B and a spacer element layer 107B.

Figure 2C:
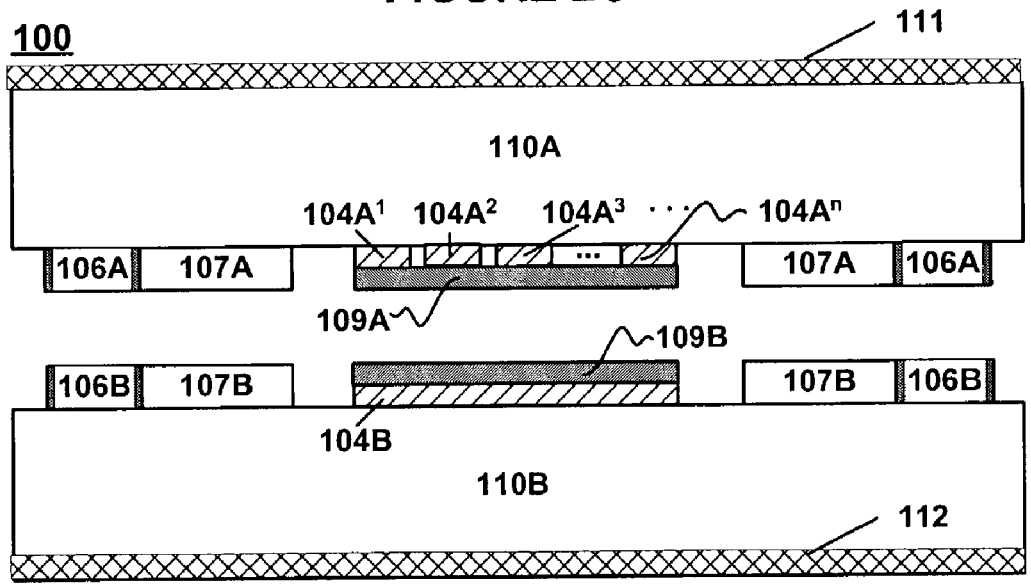
FIGS. 2c and 2d show example second embodiment multi-pixel liquid crystal cell platform having integrated optical elements on the first and second substrates that function globally across multiple pixels.
Figure 2D:
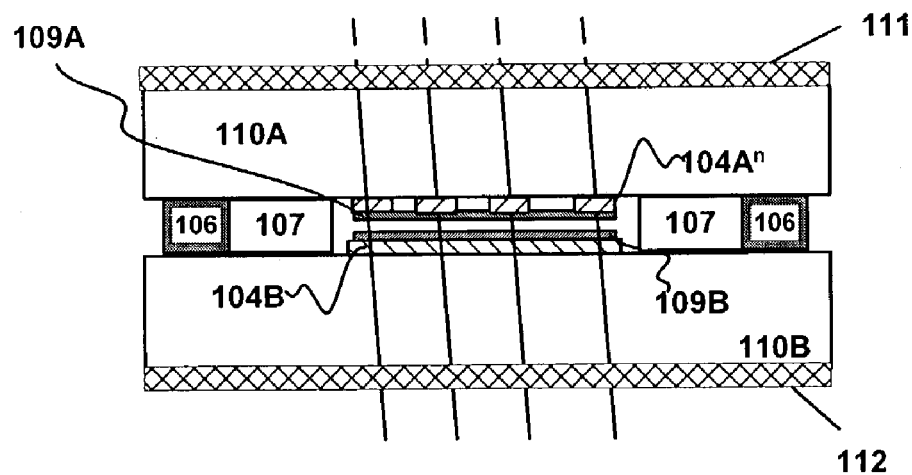

A variation of the second embodiment of the present invention is presented in FIGS. 2c and 2d, which shows a multi-pixel liquid crystal cell platform 100 having a first substrate 110A in opposition to a second substrate 110B wherein the first substrate contains a global integrated optical element 111 on one side of the substrate that performs an optical function across multiple pixel locations, a conductive electrode layer 104 patterned to form individual pixel locations $104A^1$ through $104A^n$, a liquid crystal alignment layer 109A, a metal gasket element layer 106A, and a spacer element layer 107A. In this embodiment, the second substrate 110B contains a global integrated optical element 112 on one side of the substrate that performs an optical function across multiple pixel locations, a common conductive electrode layer 104B spanning the pixels defined above, a liquid crystal alignment layer 104B, metal gasket element layer 106B, and a spacer element layer 107B. In this embodiment, the integrated optical elements 111 and 112 may provide the same or different functionality, depending on the application. For example, in application defined by an array of free space variable optical attenuators, a transmissive cell 100 might be configured with a plurality of pixels $104^{1 \cdots n}$ formed from substrates having two polarizers transmitting perpendicular states of light, 111, 112, respectively. In an optical switching application, a reflective cell 100 may include a plurality of pixels $104^{1 \cdots n}$ formed from a first substrate having optical element 111 functioning as a polarization beam splitter and combiner, and the second substrate having optical element 112 functioning as a mirror.

Figure 3A:
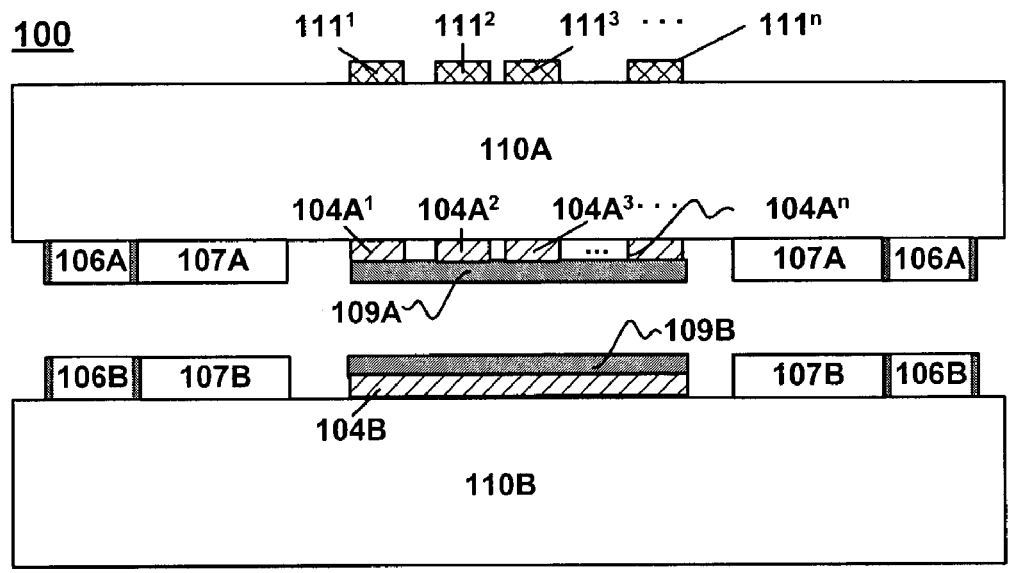
FIGS. 3a and 3b show example third embodiment multi-pixel liquid crystal cell platform having an integrated optical element on the first substrate that provides an optical function at each local pixel location.
Figure 3B:
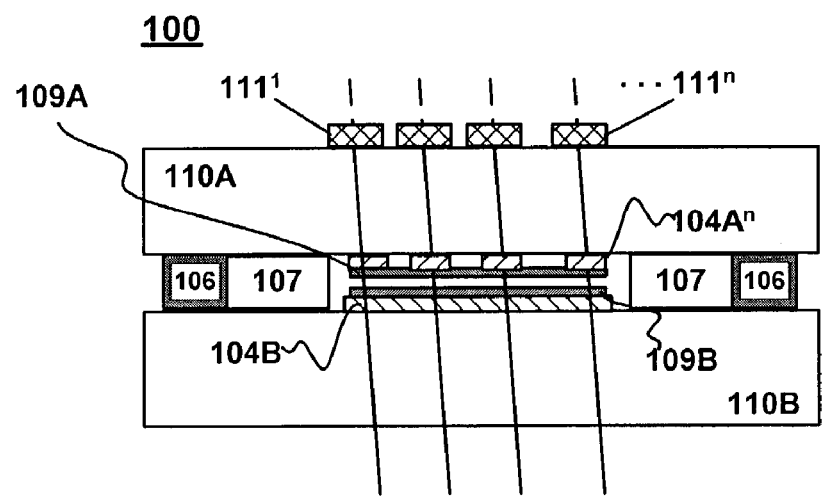

A third embodiment of the present invention is presented in FIGS. 3a and 3b, which shows a multi-pixel liquid crystal cell platform 100 having a first substrate 110A in opposition to a second substrate 110B wherein the first substrate contains integrated optical elements $111^n$ positioned at referential pixel locations, a conductive electrode layer 104 patterned to form individual pixel locations $104A^1$ through $104A^n$, a liquid crystal alignment layer 109A, a metal gasket element layer 106A, and a spacer element layer 107A. In this embodiment, the second substrate 110B contains a common conductive electrode layer 104B spanning the pixels defined above, a liquid crystal alignment layer 104B, metal gasket element layer 106B, and a spacer element layer 107B.

A first variation of the third embodiment of the present invention is presented in FIGS. 3c and 3d, which shows a multi-pixel liquid crystal cell platform 100 having a first substrate 110A in opposition to a second substrate 110B wherein the first substrate contains integrated optical elements $111^n$ positioned at referential pixel locations, a conductive electrode layer 104 patterned to form individual pixel locations $104A^1$ through $104A^n$, a liquid crystal alignment layer 109A, a metal gasket element layer 106A, and a spacer element layer 107A. In this embodiment, the second substrate 110B contains integrated optical elements $112^n$ positioned at referential pixel locations, a common conductive electrode layer 104B spanning the pixels defined above, a liquid crystal alignment layer 104B, metal gasket element layer 106B, and a spacer element layer 107B. In this embodiment, the integrated optical elements $111^n$ and $112^n$ may provide the same or different functionality across pixels, depending on the application. For example, in an application that requires one pixel to perform as a free space variable optical attenuator and a second pixel to perform as a switching cell, a first transmissive pixel might be configured with two polarizers transmitting perpendicular states of light, $111^1$, $112^1$ while the second pixel may be reflective and include an optical element $111^2$ functioning as a polarization beam splitter and combiner, and optical element $112^2$ functioning as a mirror.

A second variation of the third embodiment of the present invention is presented in FIGS. 3e and 3f, which shows a multi-pixel liquid crystal cell platform 100 having a first substrate 110A in opposition to a second substrate 110B wherein the first substrate contains integrated optical elements $111^n$ positioned at referential pixel locations, a conductive electrode layer 104 patterned to form individual pixel locations $104A^1$ through $104A^n$, a liquid crystal alignment layer 109A, a metal gasket element layer 106A, and a spacer element layer 107A. In this embodiment, the second substrate 110B contains a global integrated optical element 112 on one side of the substrate that performs an optical function across multiple pixel locations, a common conductive electrode layer 104B spanning the pixels defined above, a liquid crystal alignment layer 104B, metal gasket element layer 106B, and a spacer element layer 107B. In this embodiment, the integrated optical elements $111^n$ and $112^n$ may provide the same or different functionality across pixels, depending on the application. For example, in an application that requires one pixel to perform as a free space variable optical attenuator and a second pixel to perform as a switching cell, a first transmissive pixel might be configured with two polarizers transmitting perpendicular states of light, 111$^1$, 112$^1$ while the second pixel may be reflective and include an optical element 111$^2$ functioning as a polarization beam splitter and combiner, and optical element 112$^2$ functioning as a mirror.

An active thermal element, integrated heater and temperature sensor device may be sandwiched between the first and second substrates, 110A and 110B, to provide uniform heating and temperature sensing across the multiple pixels in the array. FIGS. 3g and 3h show the integrated heater and temperature device 108 as applied to continuing example second variation of the third embodiment as previously described however it need be stated that the integrated heater and temperature sensor device may be integrated into all embodiments and variations of the present invention as will be described in the detailed process flow.

A library of pixel constructs designed to perform specific optical functions is presented in FIG. 4 in which a dotted box is used to highlight the pixel constructs and show the path of an optical signal passing through the pixel. For each pixel construct, various configurations are shown as they relate to the various embodiments and configurations of the present invention. Common features outlined the FIG. 4 are enumerated in FIG. 4A[a–d] only. For clarity sake, only new features embodied by a pixel construct shall be enumerated in the following pages of FIG. 4.

Figure 4A:
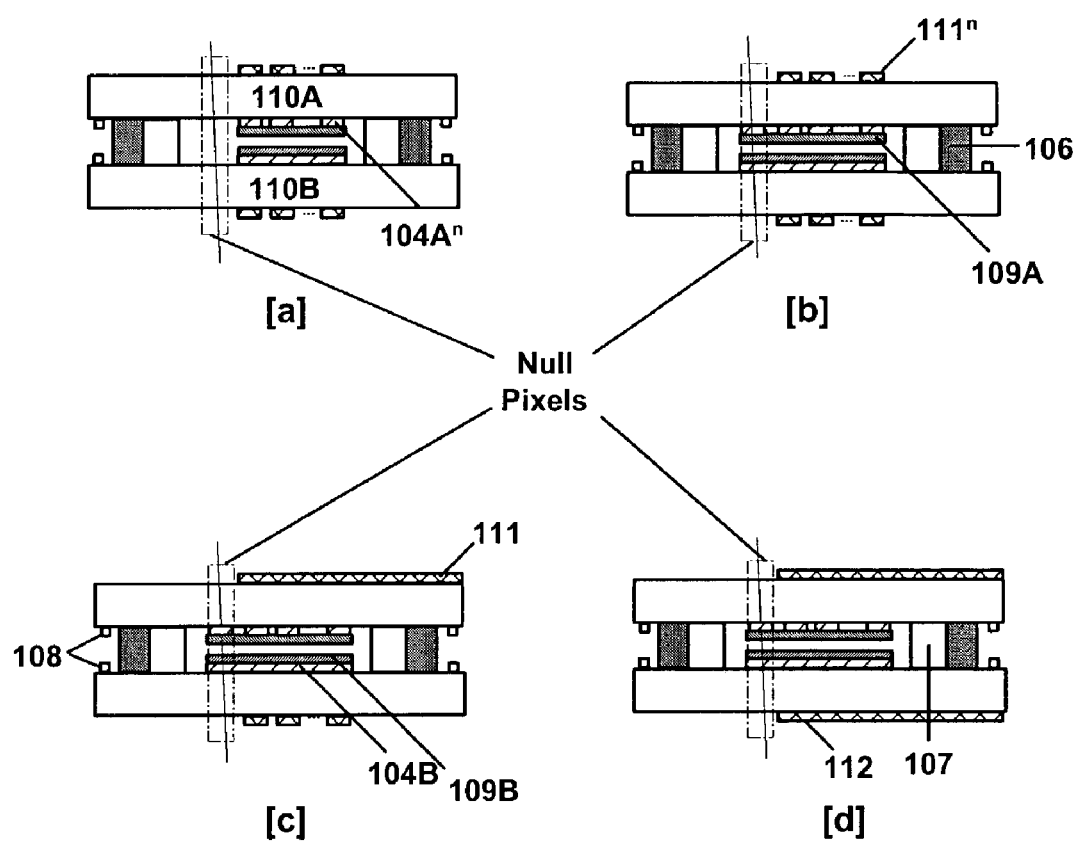
FIG. 4A shows various null pixel constructs designed to perform substantially no optical manipulation of light other than the polarization rotation capability provided by the liquid crystal capability demonstrated in subfigures [b], [c] and [d].

FIG. 4A shows various null pixel constructs designed to perform substantially no optical manipulation of light other than the polarization rotation capability provided by the liquid crystal capability demonstrated in subfigures [b], [c] and [d]. As shown, the electrode and alignment layers 104 and 109 may be omitted in a null pixel construct, and the integrated optical elements may be masked off or omitted at each null pixel.

Figure 4B:
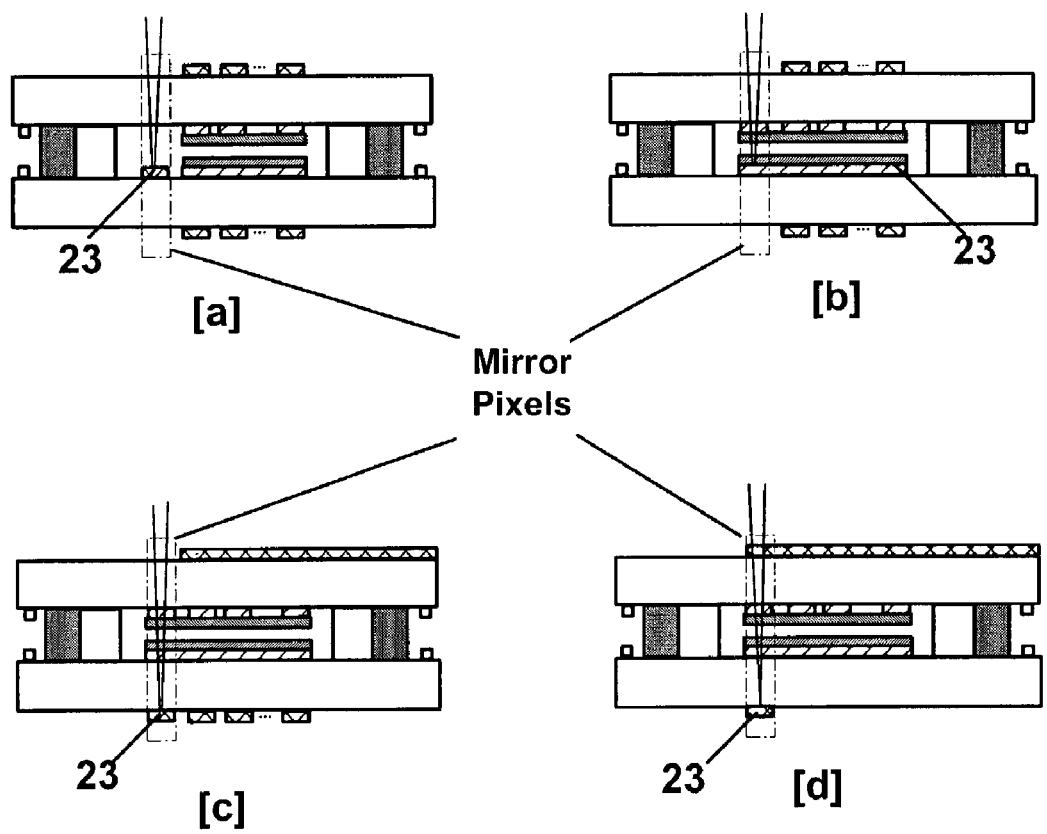
FIG. 4B shows various mirror pixel constructs designed to fully reflect an optical signal off the mirror pixel.

FIG. 4B shows various mirror pixel constructs designed to fully reflect an optical signal off the mirror pixel. The mirror 23 may be a plasma enhanced chemical vapor deposition (PECVD) of gold and be located on the same plane as the electrode layer 104 as shown in sub figure [a]. An electrically conductive common mirror 23 may extend across multiple pixels and replace the ITO layer as shown in sub figure [b]. The mirror may be deposited at a referential pixel location on the outer surface of substrate 110B as shown in sub figure [c]. An optical element may be positioned over the mirror pixel on the first substrate 110A. Sub figure [d] shows a global optical element that spans multiple pixels on the first substrate 110A in a mirror pixel of sub figure [c].

Figure 4C:
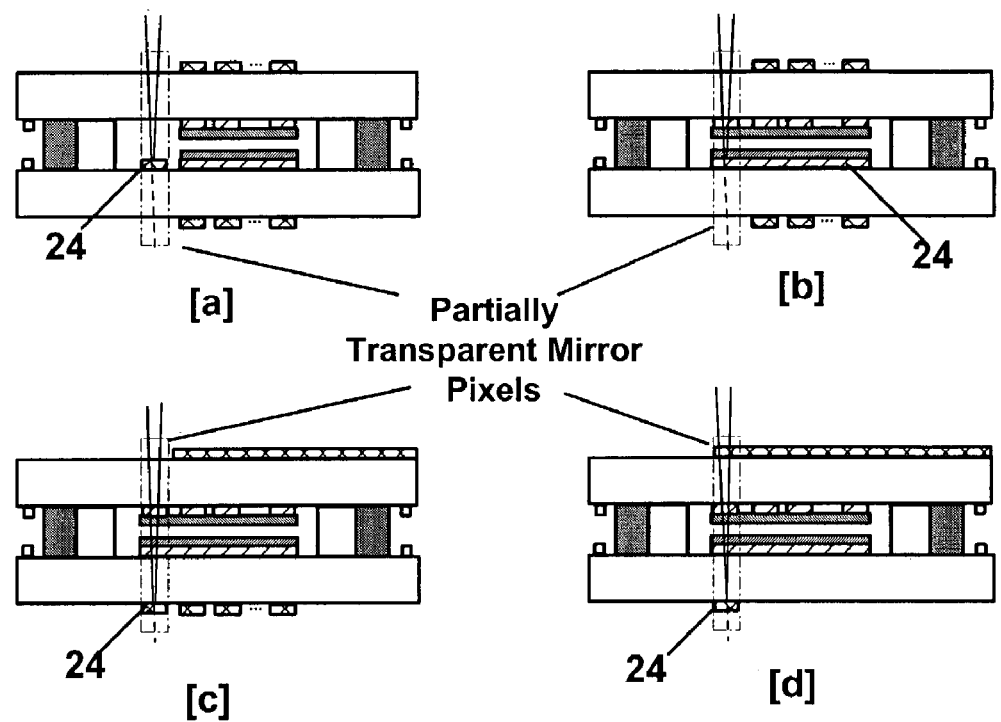
FIG. 4C shows various partially transparent pixel constructs designed to partially reflect an optical signal off the partially transparent pixel.

FIG. 4C shows various partially pixel constructs designed to partially reflect an optical signal off the partially transparent pixel. The mirror 24 may be a PECVD deposition of gold and masked to allow a percentage of light through the cell. The mirror 24 may be located on the same plane as the electrode layer 104 as shown in sub figure [a]. An electrically conductive common mirror 24 may extend across multiple pixels and replace the ITO layer as shown in sub figure [b]. The mirror may be deposited at a referential pixel location on the outer surface of substrate 110B as shown in sub figure [c]. An optical element may be positioned over the mirror pixel on the first substrate 110A. Sub figure [d] shows a global optical element that spans multiple pixels on the first substrate 110A in a mirror pixel of sub figure [c].

Figure 4D:
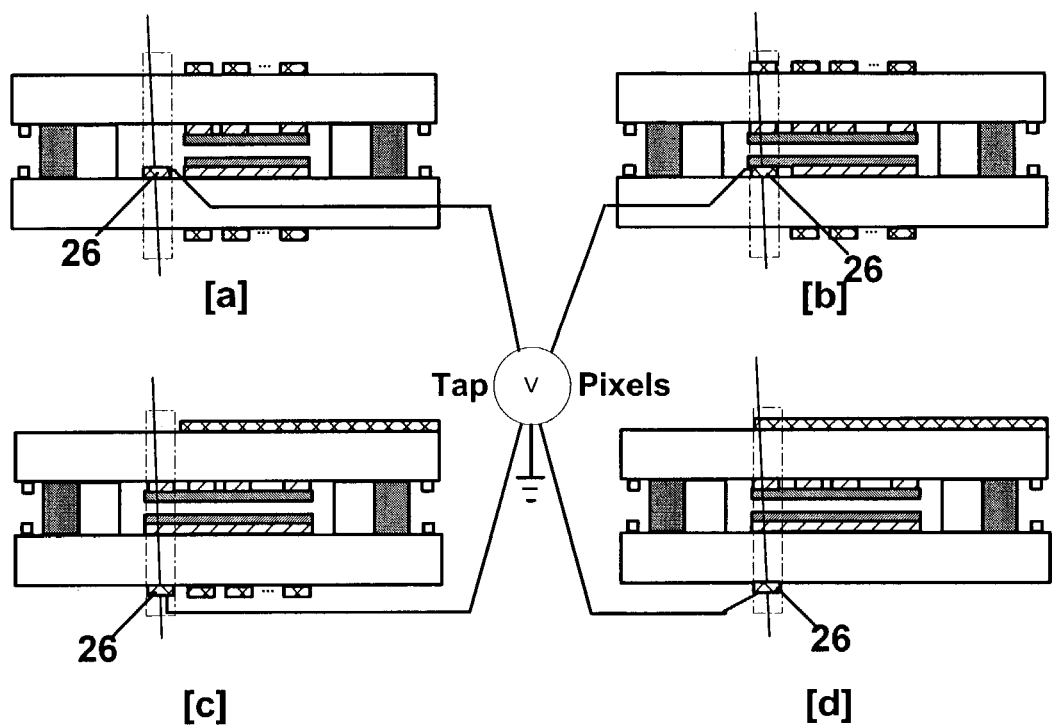
FIG. 4D shows various tap pixel constructs designed to generate a voltage in response to an optical signal passing through the tap pixel.

FIG. 4D shows various tap pixel constructs designed to generate a voltage in response to an optical signal passing through the tap pixel. The tap 26 may be a PECVD deposition of photovoltaic material, such as gallium arsenide, suitable to create a voltage when exposed to incident light. The tap may be connected through a via and routed to a contact pad to enable access to the electronic signal (not shown). Tap 26 may be located on the same plane as the electrode layer 104 as shown in sub figures [a] and [b]. The tap may be deposited on the outer surface of substrate 110B as shown in sub figures [c] and [d].

Figure 4E:
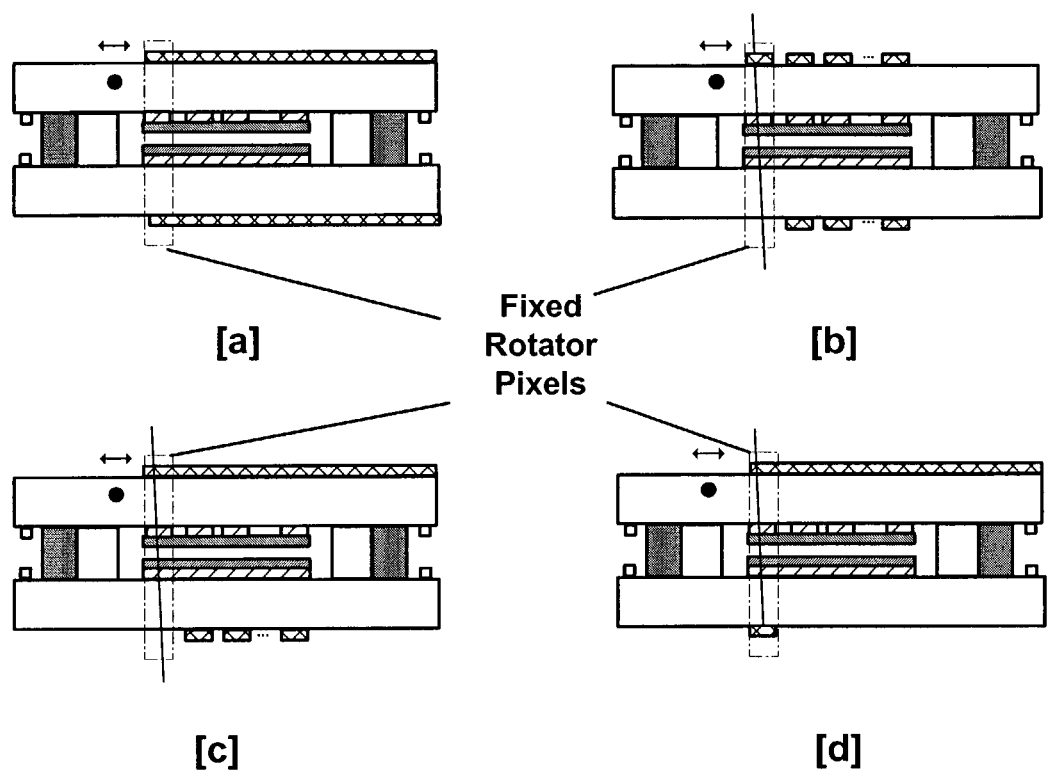
FIG. 4E shows various fixed rotator pixel constructs designed to rotate the polarization of an optical signal passing through the fixed rotator pixel by a fixed degree.

FIG. 4E shows various fixed rotator pixel constructs designed to rotate the polarization of an optical signal passing through the fixed rotator pixel by a fixed degree. A fixed rotator pixel is formed by way of optical element 111 providing a waveplate function that produces a fixed degree of polarization rotation to the light as it passes through the optical element 111 into substrate 110A. Optical element 111 is preferably a nanostructured grating.

Figure 4F:
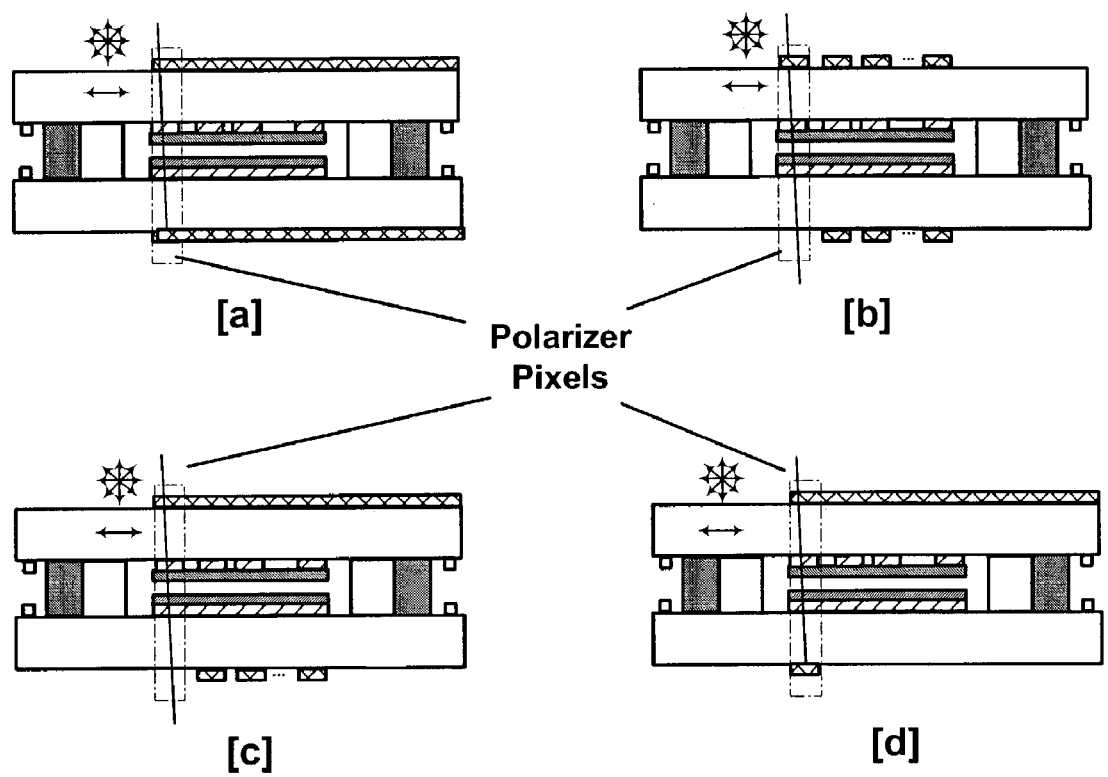
FIG. 4F shows various polarizer pixel constructs designed to pass a specific polarization of the optical signal passing through the polarizer pixel.

FIG. 4F shows various polarizer pixel constructs designed to pass a specific polarization of the optical signal passing through the polarizer pixel. Preferably, the optical element 111 is a nanostructured grating polarizer masked and designed to provide specific polarization at referential pixel locations as outlined in sub figures [a] and [b], or optical 111 is a global nanostructured grating polarizer providing the same polarization selectivity across multiple pixels in the array as shown in sub figures [b] and [c].

Figure 4G:
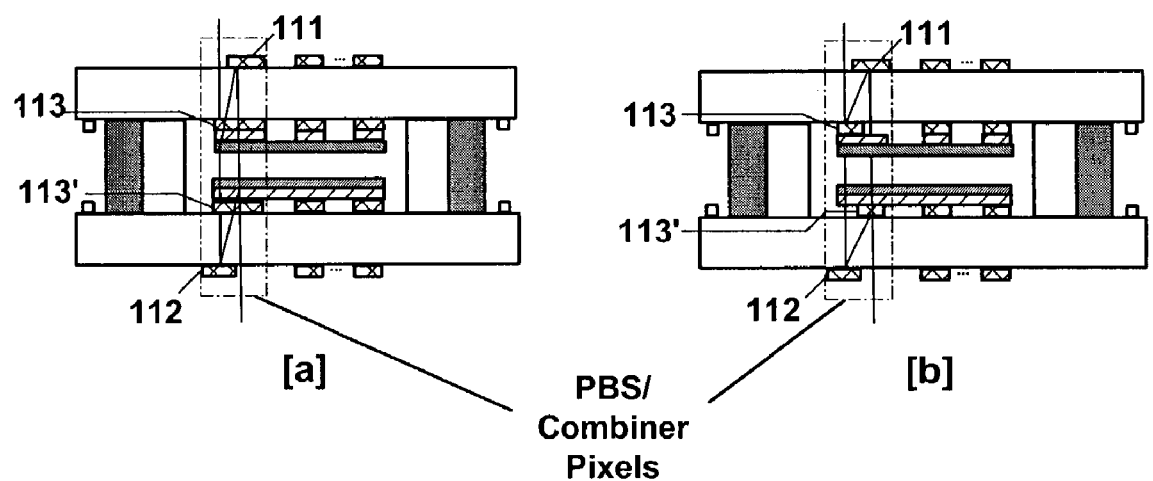
FIG. 4G shows various PBS/combiner pixel constructs designed to split the incoming light signal into two polarizations and recombine the outgoing light into a single beam.

FIG. 4G shows various polarization beam splitter (PBS)/combiner pixel constructs designed to split the incoming light signal into two polarizations and recombine the outgoing light into a single beam. The PBS/combiner pixel construct may form a polarization independent variable optical attenuator that may be controlled by the electronic system of the present invention. Sub figure [a] shows a PBS/combiner pixel formed by way of optical element 113, a nanostructured polarization beam splitter grating applied under the liquid crystal alignment layer and reflecting orthogonally polarized light while passing light polarized parallel to itself. Light orthogonally polarized with respect to optical element 113 is reflected to optical element 111 that is positioned on the outer surface of substrate 110A and that rotates and reflects the signal to optical element 113' which recombines the output signal with the parallel light initially passed through optical element 113 and reflected of optical element 112, a rotating mirror positioned on the outside of substrate 110B. Sub figure [b] shows a PBS/combiner pixel formed by way of optical element 113, a nanostructured polarization beam splitter grating applied under the liquid crystal alignment layer and reflecting orthogonally polarized light while passing light polarized parallel to itself. Light orthogonally polarized with respect to optical element 113 is reflected to optical element 111 that is positioned on the outer surface of substrate 110A and that reflects the signal to optical element 113' which recombines the output signal with the parallel light initially passed through optical element 113 and reflected of optical element 112, a mirror positioned on the outside of substrate 110B.

Figure 4H:
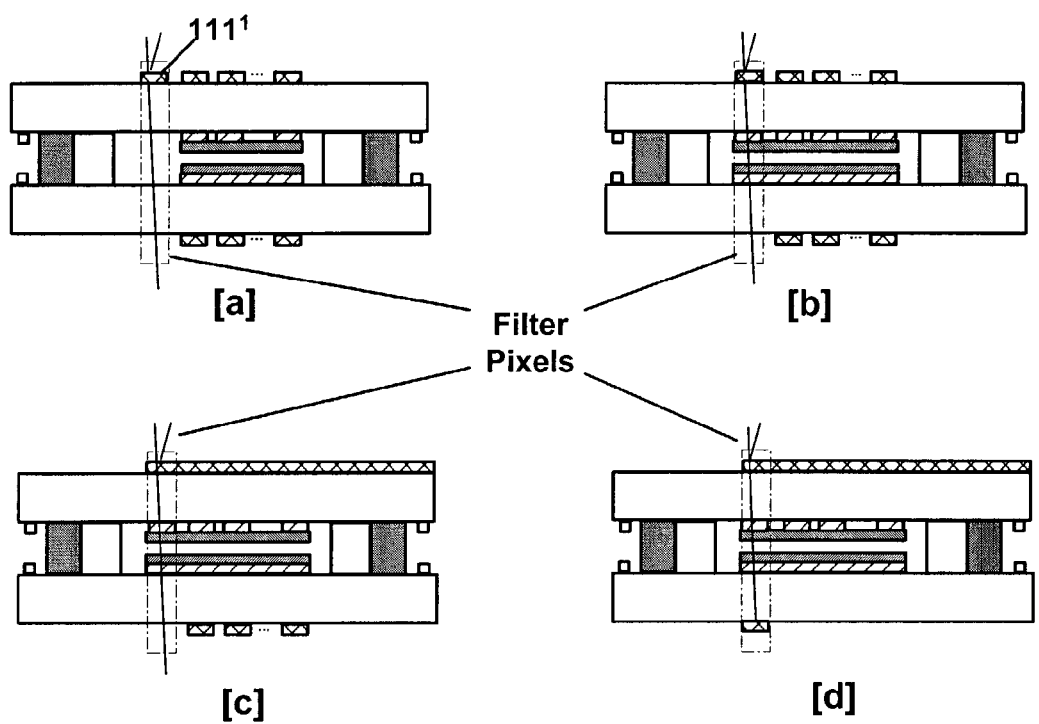
FIG. 4H shows various filter pixel constructs designed to provide filtration of light passing through the filter pixel.

FIG. 4H shows various filter pixel constructs designed to provide filtration of light passing through the filter pixel. Sub figures [a] and [b] show local optical elements 111" positioned over each pixel location and providing an optical filter capability. The optical element filters 111" may be cutoff filters or bandpass filters, depending on the application. The filters may be thin films designed with high Q to pass specific wavelengths of light. Each pixel location may have a different filter associated therewith. The filter optical elements 111" may have different filter values associate therewith and further be formed by a single masked nanostructured grating with different surface relief patterns associated with each pixel, each filter. Sub figures [c] and [d] show a global optical element 111 that span multiple pixels.

Figure 4I:
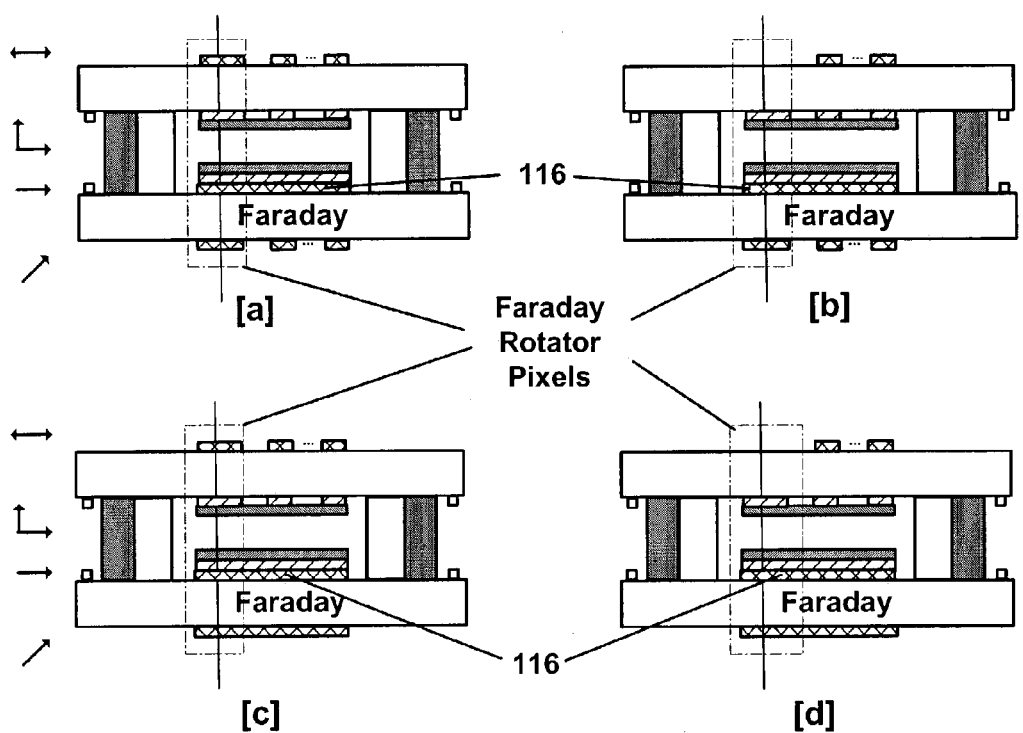
FIG. 4I shows various Faraday rotator pixel constructs designed to provide attenuation and isolation of a light signal as it passes through the Faraday rotator pixel.

FIG. 4I shows various Faraday rotator pixel constructs designed to provide attenuation and isolation of light signal as it passes through the Faraday rotator pixel. The Faraday rotator pixel construct may form a polarization dependent variable optical attenuator with integrated isolator. In sub figures [a]–[d], an optical signal passing through the pixel passes through the liquid crystal material that may controllably rotate the optical signal by substantially 0 to 90 degrees. An optical element 116 polarizer is positioned adjacent to the substrate 110B. The liquid crystal electrode and alignment layers sit on top of the polarizer optical element. The polarizing optical element may be a nanostructured grating etched into the substrate 110B. Substrate 110B must be made from a material capable of performing a Faraday rotation function, such as rare earth doped Garnet.

With respect to all embodiments, it is generally preferable that substrate 110 be comprised of glass but other substrate materials, including Garnet, silicon, polymers, etc., may be suitable depending on the pixel constructs and applications.

Figure 5:
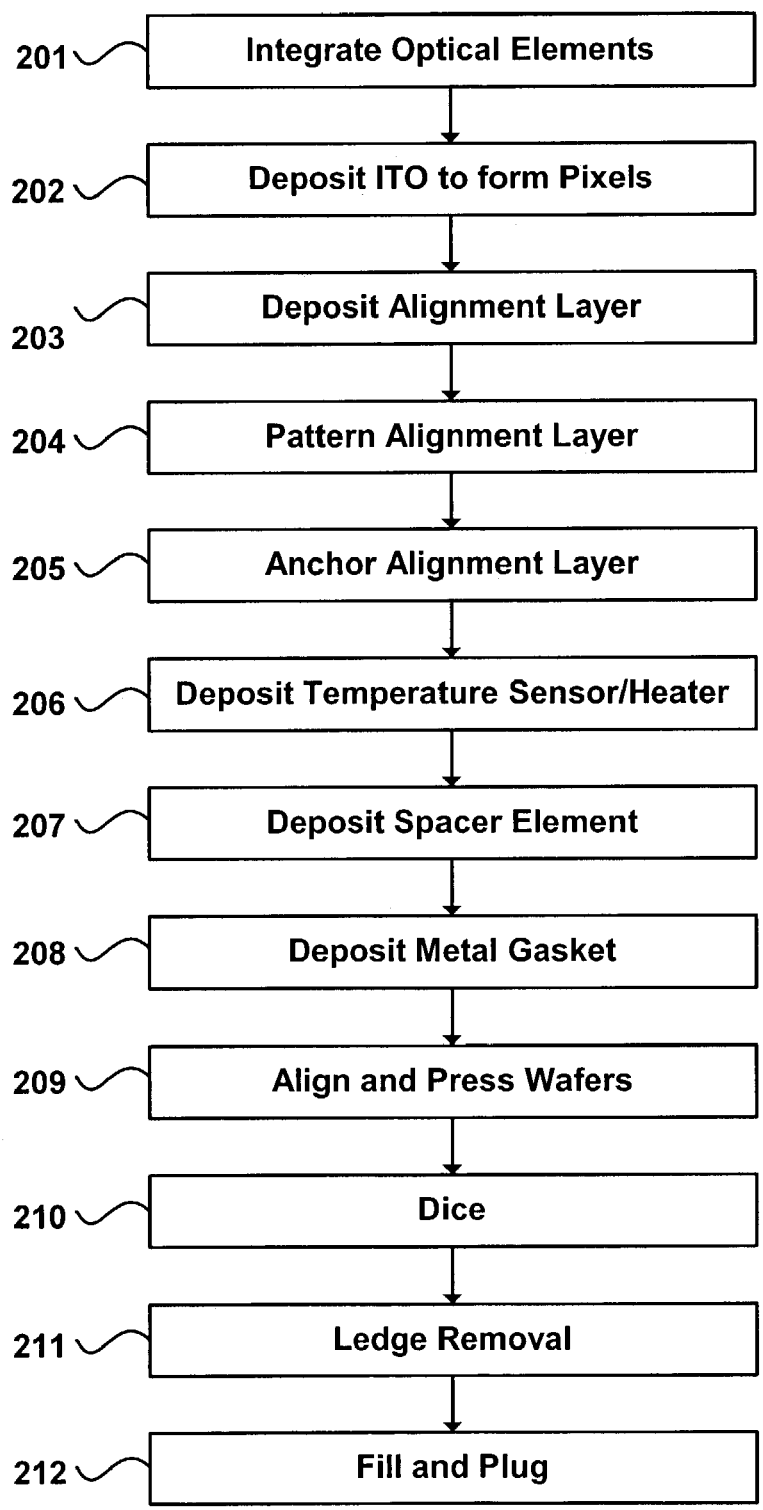
FIG. 5 shows one process flow for fabricating the liquid crystal cells of the present invention.

FIG. 5 shows one example fabrication process to create the liquid crystal cell platform 100. Various optional steps may be omitted depending on the embodiment of configured features.

With respect to FIG. 5, optional step one involves integrating the optical elements into the first and/or second substrates. The optical element may function as a polarizer, beam splitter, filter, thin film, polarization beam splitter, waveguide, waveplate, combiner, mirror, partially transparent mirror, isolator, detector, grating, subwavelength grating, nanostructure, or some combination thereof and including those optical functions presently known in the art. Preferably, the optical element is a nanostructured grating feature, such as those described by NanoOpto Corporation of New Jersey. The grating feature may be integrated into the inner and/or outer substrates 110A or 110B, or onto both substrates depending on the application. All optical elements, including those referred to as 111 and 112, may be patterned with a nanostructured gratings and masked such that a specific optical function may be defined at referential pixel locations $104^1 \ldots 104^n$.

With respect to process step 201, the substrates are etched using nanoimprint lithography or similar methods known in the field based on impressing a reference mask into photo resist to create surface relief patterns on the substrate where the surface relief photo resist pattern is etched to form grating features in the nanometer range. A uniform mask may be used to pattern a global optical function across multiple pixels or the mask may be designed to provide local optical functions at referential pixel locations based on changing the period and size of the relief structures. The optical elements may be integrated into the inner and/or outer surfaces or the first and/or second substrates, depending on the pixel construct under development. Alternately, the optical element may be supplied as a discreet chip and bonded to the target substrate by way of epoxy or other methods described herein or otherwise generally known. In the case where an array of optical elements having different optical functions are required for each pixel and where the use of nanoimprint lithography does not provide the required optical function, the substrate may be iteratively processed such that multiple PECVD deposition stages are performed to apply the appropriate optical elements onto the substrates. The optical element may be deposited directly on the inner or outer surface of either substrate, or both. Finally, the optical element itself may be integrated into the substrate by way of choice of substrate material. For example, the substrate 110A, 110B or both substrates may be made of Polarcor, a linearization polarization glass made by Corning, Inc.

Figure 6A:
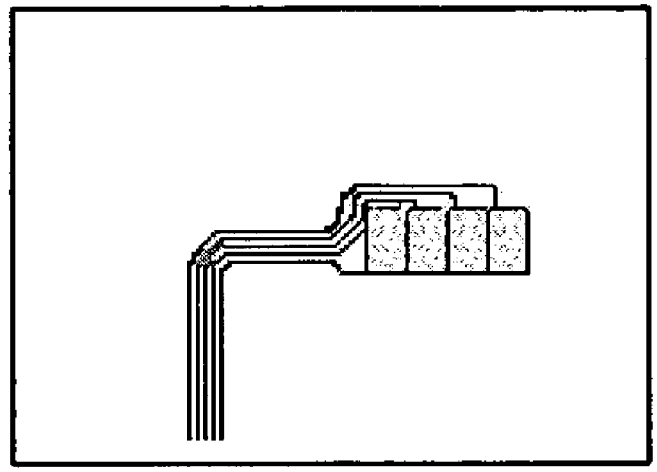
FIGS. 6A and 6B show example four pixel indium tin oxide (ITO) electrode forming masks of the present invention.
Figure 6B:
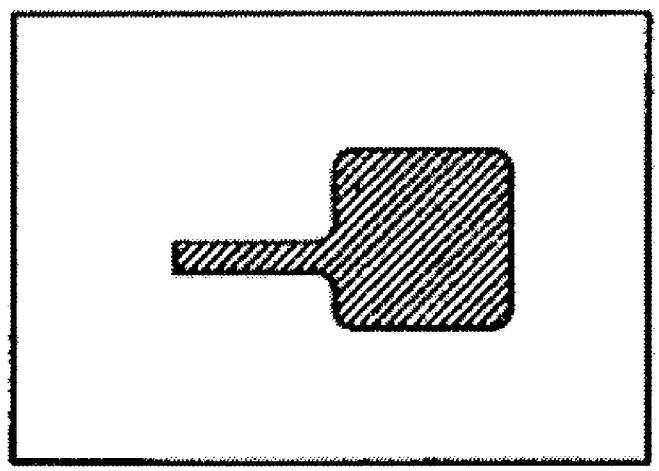

Step two involves adding the appropriate ITO (or other transparent conductive material) patterns to the first and second glass substrates to form the liquid crystal electrodes. With respect to process flow 202 of FIG. 5, a standard PECVD process may be used to apply thin film of ITO approximately 100 angstroms thick. FIGS. 6A and 6B show example ITO masks that may be used to pattern substrates 110A and 110B, respectively.

Step three involves adding a polyimide alignment layer to the first and second glass substrates. With respect to process flow 203 of FIG. 5, standard spin coating stepped processes may be used at room temperature to create a layer of polyimide approximately 600 angstroms thick on each substrate.

Step four involves patterning the polyimide layer. With respect to process 204, photo resist may first be applied to the substrates and masked using traditional photolithography techniques or laser etching may be used to pattern the substrates. Wet or dry etching performed thereafter may result in a pattern of polyimide.

Step five involves anchoring the liquid crystal alignment layers. With respect to process step 205, one traditional method is to rub the polyimide of each substrate to form the alignment layers. In a twisted nematic configuration, the rubbing direction of the first substrate may be orthogonal to the rubbing direction of the second substrate. In an electronically conductive birefringence (ECB) configuration, the rubbing direction of the first substrate may be parallel to the rubbing direction of the second substrate. Various anchoring schemes may be define rub angles other than 0 or 90 degrees. An alternate method of forming the alignment layers is to employ an imprint lithography technique where a reference mask is pressed onto a deposited photo resist layer to create surface relief patterns in the photo resist which is subsequently etched to form high precision alignment grooves with nanoscale tolerance.

Steps three, four and five as mentioned above may be replaced by an alternative preferred anchoring step that involves the use of a photo sensative anchoring medium, such as Staralign by Vantio of Switzerland. The photosensative anchoring medium may be spin applied to the substrates 110A and 110B and masked to achieve specific anchoring energy and direction. UV light masking of various patterns, including specific directional application may be used to form individual pixels. Pixels may be formed with different rub characteristics, depending on the application.

Figure 7A:
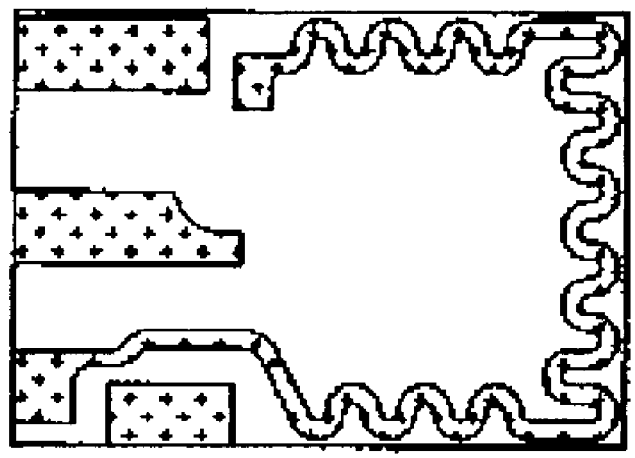
FIGS. 7A and 7B show example integrated active thermal element forming masks of the present invention.
Figure 7B:
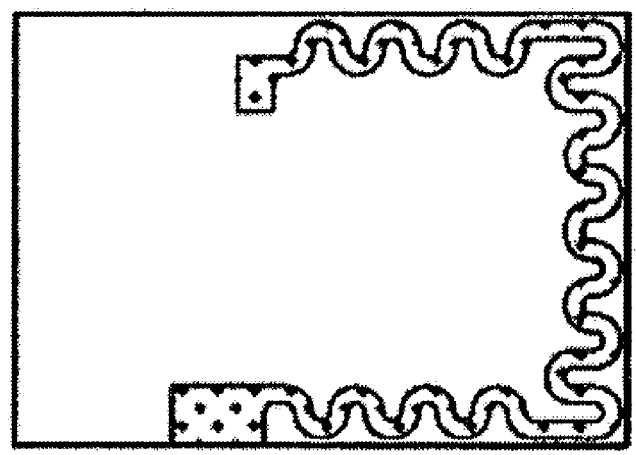

Optional step six involves creating the active thermal element, integrated heater and temperature sensor. FIGS. 7A and 7B show example masks that may be use with respect to process step 206 of FIG. 5, in which a seed adhesion layer of chrome is first deposited approximately 200 angstroms thick onto the substrates, followed by a PECVD deposition thin film platinum resistor layer approximately 2000 angstroms thick and forming the upper and lower portions of the integrated heater/temperature sensor. The upper and lower portions of the integrated device, applied to substrates 110A and 110B, may be separated by an air gap approximately 9.6 microns and interconnected by VIAS formed from a metal deposition step that will be described in succeeding step eight. Again, it need be stated that gap thickness is delineated for example purposes and will change depending on the desired application. It should be stated that, depending on the configuration, the platinum thin film resistor may be patterned in various shapes, including but not limited to arched, curved, circular, zigzag, stripped as well as the serpentine pattern of FIGS. 7A and 7B. Given the resistivity of the thin film platinum, approximately 10.6E-8 ohm meters, the example shown yields approximately 100 ohms resistance at room temperature.

Figure 8A:
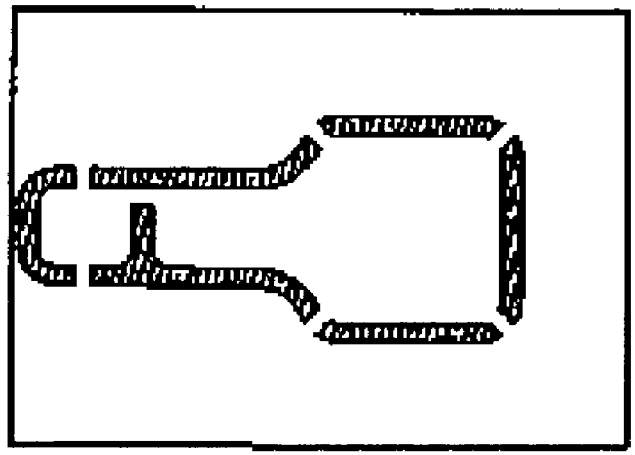
FIGS. 8A and 8B show example spacer element forming masks of the present invention
Figure 8B:
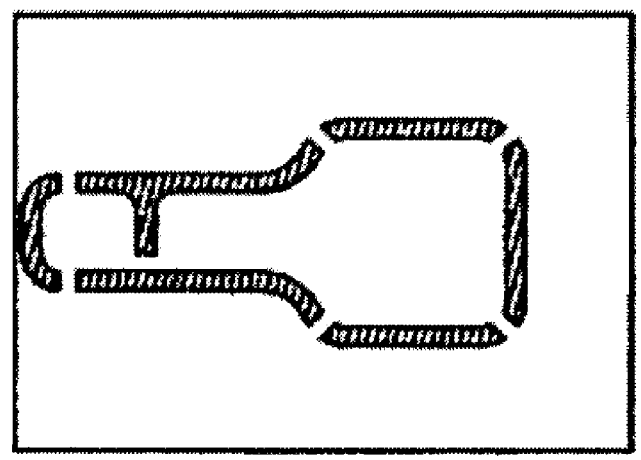

Step seven involves creating the spacer element 107. Spacer element 107 controls the gap thickness of the liquid crystal cell. While it is not necessary to equally distribute the spacer element equally on each substrate, it is preferred that one half of the desired gap thickness of the completed cell shall define the thickness of the spacer element 107 as deposited on each substrate. The combined cell 100 gap thickness may therefore be formed with a tolerance based on the deposition process. Silicon dioxide is the preferred material for creating the spacer element, however other materials such as aluminum oxide, silicon nitride, silicon monoxide and other materials compatible with thin film deposition processes that do not substantially compress may also be used as an alternative to the silicon dioxide provided they are compatible with the selected liquid crystal substrate material. FIGS. 8A and 8B show an example mask that may be used to perform the process step 207 of FIG. 5, where a patterned layer of 5 microns thick of silicon dioxide is deposited onto each substrate.

Figure 9A:
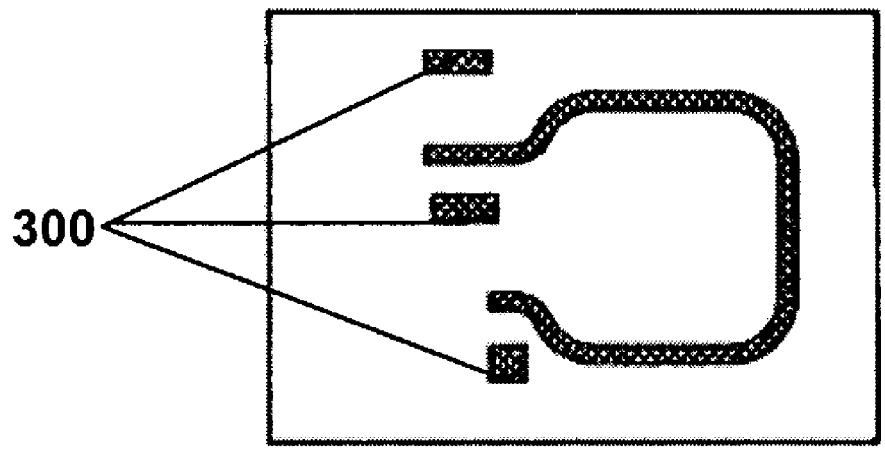
FIGS. 9A and 9B show example masks for defining a metal gasket element layer of the present invention.
Figure 9B:
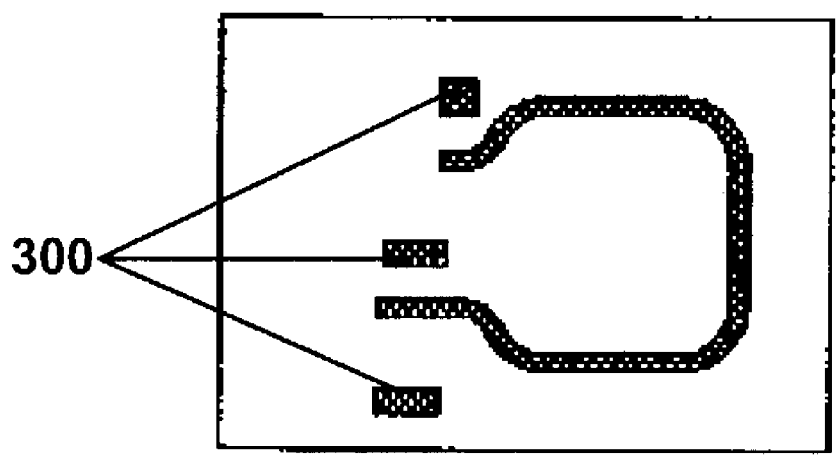

Step eight involves creating the metal gasket element 106. Metal gasket element 108 may be made from a variety of metals, including but not limited to, indium, gold, nickel, tin, chromium, platinum, tungsten, silver, bismuth, germanium and lead. However it is preferable to use indium because of its pliability and relatively low melting temperature. FIGS. 9A and 9B show example masks that may be used to perform process step 208 of FIG. 5, where, for the continuing example purpose, a layer approximately 7 to 9 microns thick of indium may equally be deposited on each substrate. It is generally preferable that metal gasket layer of this process step is deposited thicker than the spacer element of the previous step due to seepage that occurs during the additional processing steps. Metal gasket masks, such as those shown in FIGS. 9A and 9B, may be configured to form referential VIAS 300 that enable electrical interconnection between features deposited on either substrate 110A or 110B. VIAS 300 may also be formed to simplify routing external contact pads to the temperature sensor and heating element. For example the VIAS 300 of the present example are positioned to overlap the heater/temperature sensor platinum layer defined in step six. They are also positioned to overlap the ITO layer so as to define contact pads to drive the two electrodes of the liquid crystal cell.

Step nine involves aligning and pressing wafers 110A together with 110B. It is known that visual alignment reference marks may be etched into the underlying wafer, or that a physical feature of the glass sheet such as an edge or alignment hole may be used to perform wafer alignment. However, a high yield method of accurately aligning the relative position of the two glass substrates without the need for expensive high precision alignment equipment is hereby presented, in which complimentary interlocking geometric features deposited on each substrate, mate with each other to prevent relative movement of the glass sheets during the bonding and pressing process. Such interlocking features mitigate any non uniformity in the bonding process and given that the typical gap between two glass sheets of a liquid crystal cell is less than 20 micrometers, thin film deposition or screening processes can be used to create precisely controlled and repeatable geometric features. With respect to process step 209 of FIG. 5, the substrates 110A and 110B may be brought together, aligned under pressure at room temperature to form a chemical bond metal gasket at the gap distance defined by the sandwich spacer elements formed from both substrates.

Step ten involves dicing of the wafers. Process step 210 of FIG. 5 may be performed using a dicing saw or via etching techniques.

Figure 10A:
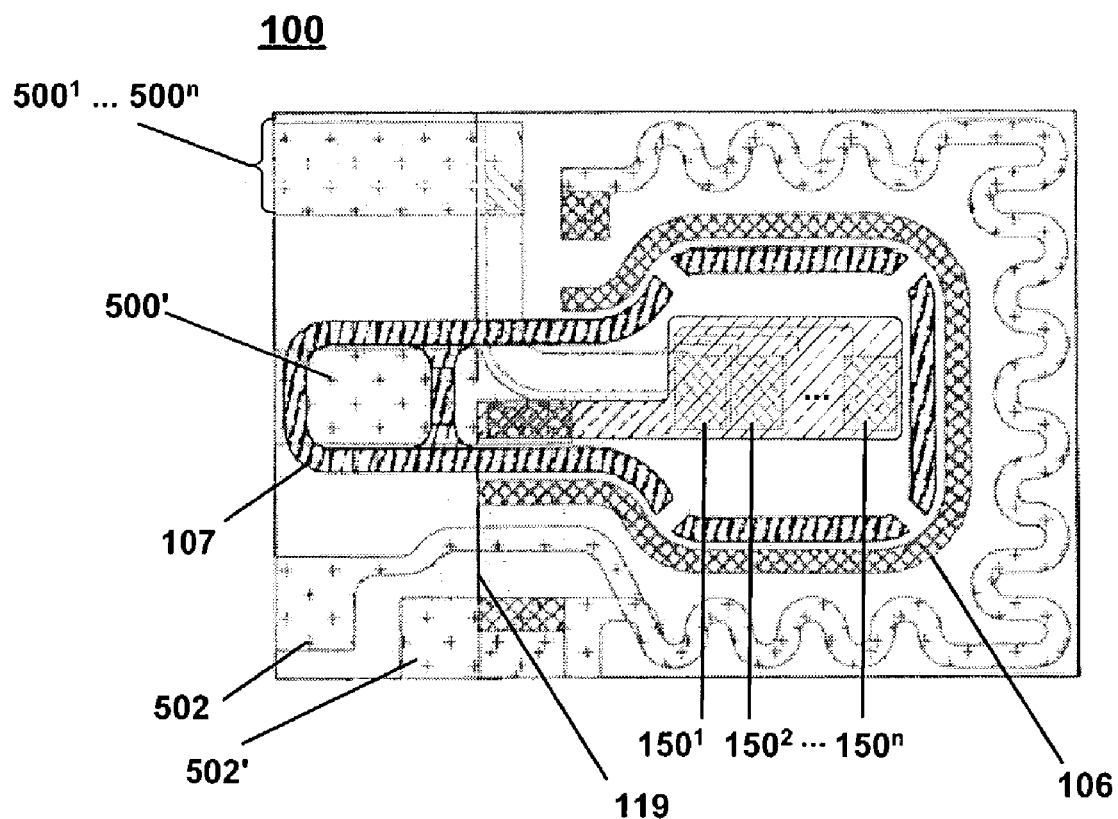
FIG. 10A shows an example top view integrated perspective showing the relationship between various layers of a one dimensional (1×N) array configuration of the present invention.
Figure 10B:
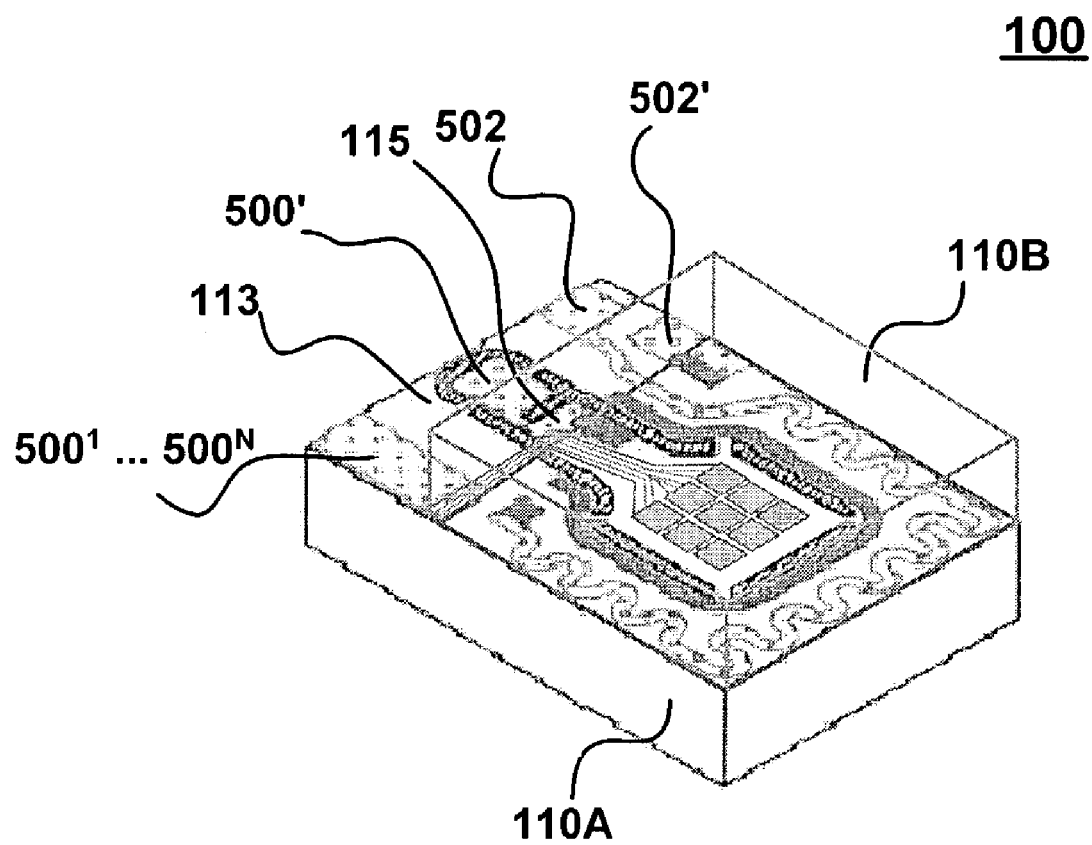
FIG. 10B is an isometric view showing a nine pixel (N×M) two dimensional liquid crystal cell at the termination of the fabrication process.

Step 11 involves removal of a portion of protective glass on the liquid crystal cell. FIG. 10A shows a top perspective of the various layers that combine through the substrates when interposed thereupon each other in a fully configured embodiment of the present invention. With respect to process 211 of FIG. 5, the substrate 110B is scored using a diamond dicing saw to cut a trench approximately 90% through the thickness of the substrate and forming the break off line 119 of FIG. 10A. A portion of the substrate 110B is broken off along the break off line 119 to define an access surface 113 of FIG. 10B that provides access to the underlying liquid crystal electrode contact pads 500 and 500', the underlying liquid crystal heater/temperature sensor element electrical contact pads 502 and 502', as well as to the liquid crystal fill port 115.

Step 12 involves filling the liquid crystal device with a liquid crystal molecules, process 212 of FIG. 5. This step may be performed using traditional methods of filling a liquid crystal cell, whereby the cell is placed in a vacuum, a droplet size of liquid crystal material is placed at the fill port 115, and with the release of the vacuum, equilibrium pressure forces the liquid crystal material into the fill port 115 and the fill port is plugged. Several techniques to cap the fill port, including UV curable epoxy which may be used to close the fill port.

Electronic Control System

Figure 11:
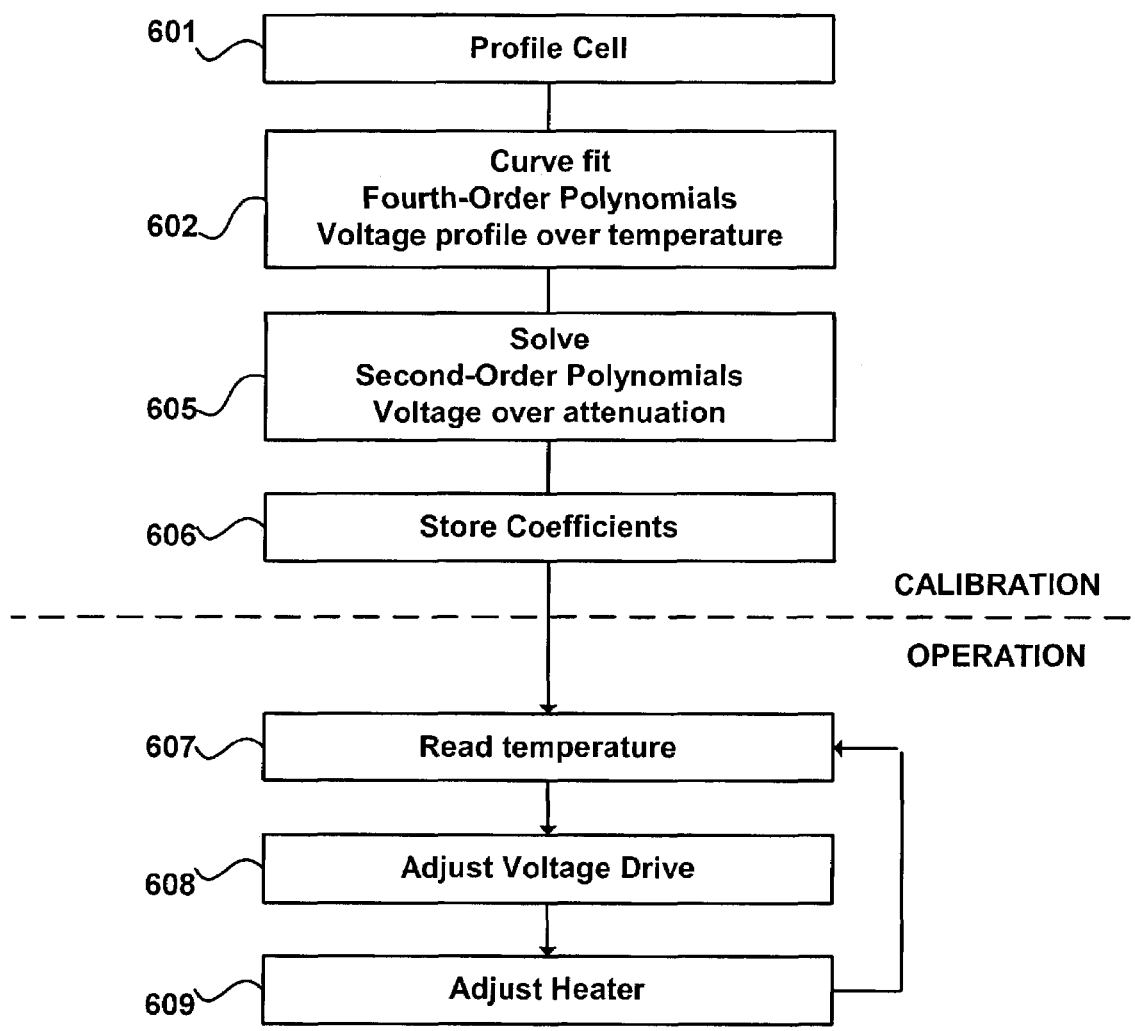
FIG. 11 shows the liquid crystal thermal calibration and feedback loop method flows.
Figure 12:
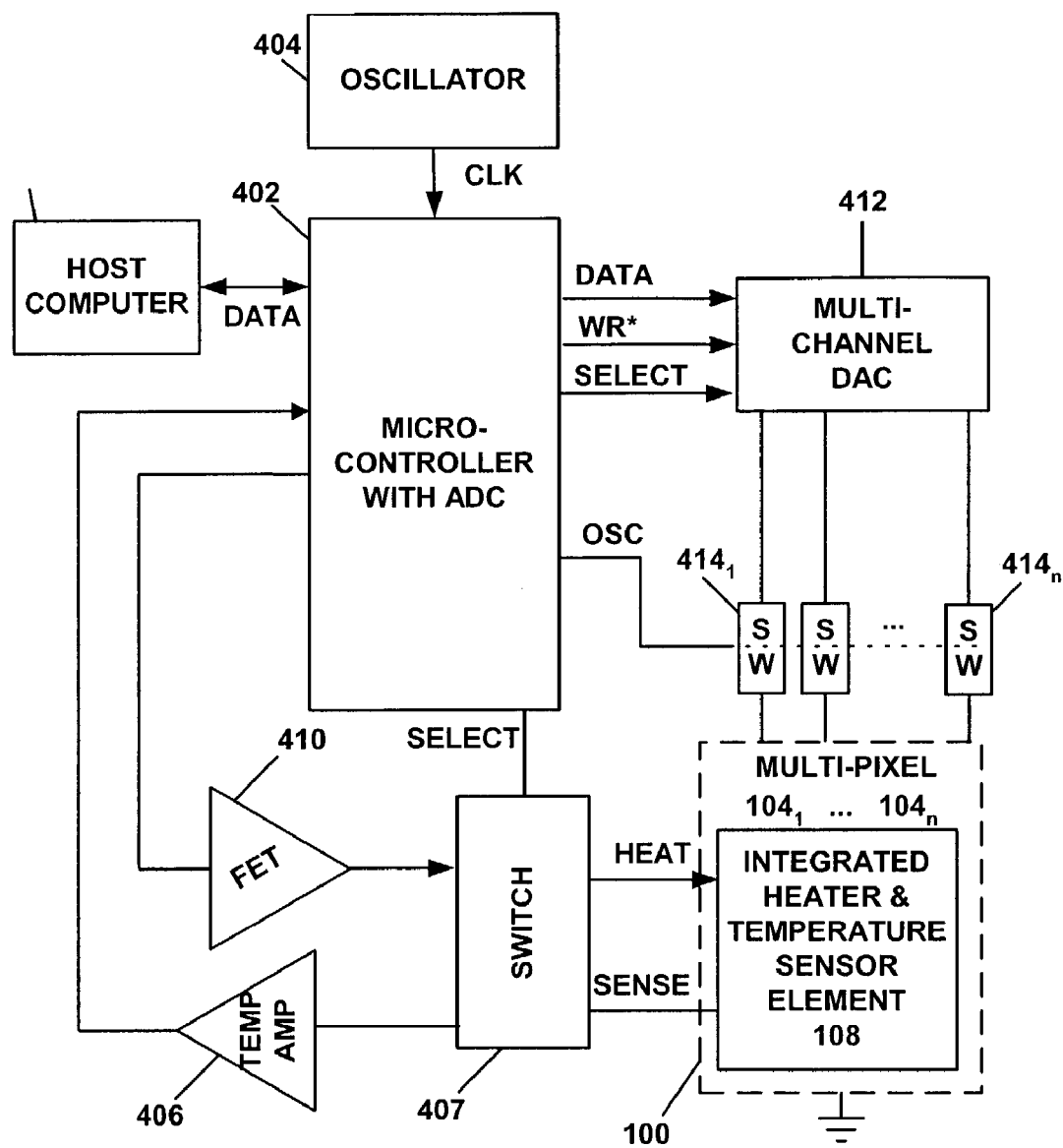
FIG. 12 shows a block system diagram for the electronic control and thermal management system of the present invention.

A block diagram of the control system and components directed to a liquid crystal cell and host controller are included in FIGS. 11 and 12 along with the liquid crystal thermal management and voltage controller subsystems of the present invention, now described in further detail.

In one example configuration, host computer 400 may be configured to communicate with microcontroller 402 over a full duplex data interface and enabling the host computer to engage functions, send commands and retrieve data from microcontroller 402. Microcontroller may be configured to store software control routines. The software control routines may function to adjust voltage drive provided to each pixel in the liquid crystal cell in response to temperature fluctuations.

The microcontroller may utilize a time division multiplexing scheme that multiplexes temperature sensing and heating functions in the integrated sensor/heater device such that the cell may generally be kept at a constant temperature. A calibration process characterizes the profile of the cell and generates a polynomial regression formula that provides the optimal voltage drive output for given temperature and cell state inputs. The microcontroller 402 stores the state of the liquid crystal cell, the regression formula, and reads the temperature of the liquid crystal cell to compute and assert the temperature compensated voltage drive.

FIG. 11 shows a calibration process that may be used to perform the method of the present invention in which a liquid crystal cell thermal operating characteristic profile is translated into deterministic coefficients assembled into a stored regression formula used to adjust the voltage drive to the cell in response to temperature and cell state.

The first step to determine the coefficient values in the cell's temperature and voltage compensation profile, is to profile the liquid crystal cell drive characteristics across a range of temperatures. The profile process step 601 may examine a light source passing through the cell and its attenuation at a given voltage and temperature combination. An operational liquid crystal cell is placed in a thermal chamber programmed to change operating temperature across the desired temperature range at a given interval. At every temperature change interval, a range of voltages are provided to the liquid crystal cell while a performance characteristic, such as attenuation, is measured. Voltage is scanned until reference attenuation levels are achieved, at which point the voltage, attenuation and temperature levels are stored as a grid reference in a cell profile definition table. The performance of the liquid crystal cell is recorded at grid point attenuation and temperature levels, resulting in a multi dimensional lookup table whereby any temperature and voltage input provides an attenuation level output. This table may be represented as a three dimensional surface.

The second step requires processing the lookup table to smooth the voltage profile over temperature at the given attenuation levels as recorded in the previous step. A statistical program capable of performing regression analysis, such as Mathematica® may be used to perform this process step 602. The regression software is provided with the look up table generated in step one, and performs a fourth order regression curve fitting process that generates for each attenuation level, the appropriate coefficients a, b, c, d, and e representing a voltage versus temperature profile of the cell at each attenuation level, represented by the following formula, $$v = a + bT + cT^2 + dT^3 + eT^4$$

$$v_1 = a_1 + b_1 T + c_1 T^2 + d_1 T^3 + e_1 T^4$$

$$v_2 = a_2 + b_2 T + c_2 T^2 + d_2 T^3 + e_2 T^4$$

$$v_n = a_n + b_n T + c_n T^2 + d_n T^3 + e_n T^4$$

where V=voltage, T=liquid crystal cell temperature, a, b, c, d, e=curve fit coefficients, and n=attenuation level.

Given that smooth curves result from the prior step that define the optimal voltage drive level for a given temperature at the recorded grid attenuation level, step three results in smooth curve regressions fit across orthogonal axis of the three dimensional surface, whereby the smooth curves are fit over the coarse attenuation grid recorded in step 1. In this third process step 603, the five coefficients of the previous step are each solved by a second order regression. Specifically, Mathematica® or any suitable program is used to solve for the three coefficients that fit the profile of each of the five coefficients a, b, c, d and e across all of the orders of the regression $v_n = a_n + b_n T + c_n T^2 + d_n T^3 + e_n T^4$. So, a smooth surface profile defines the optimum voltage compensation level given an input attenuation state and temperature by the following formula $$v = a + bT + cT^2 + dT^3 + eT^4,$$

where,
a=$(X + Y\theta + Z\theta^2)$
b=$(X_1 + Y_1\theta + Z_1\theta^2)$
c=$(X_2 + Y_2\theta + Z_2\theta^2)$
d=$(X_3 + Y_3\theta + Z_3\theta^2)$
e=$(X_4 + Y_4\theta + Z_4\theta^2)$
Theta=liquid crystal attenuation level
X, Y, Z=solution to zero order coefficient
$X_1$, $Y_1$, $Z_1$=solutions to first order coefficient
$X_2$, $Y_2$, $Z_2$=solutions to second order coefficient
$X_3$, $Y_3$, $Z_3$=solutions to third order coefficient
$X_4$, $Y_4$, $Z_4$=solutions to fourth order coefficient The fifteen coefficient solutions (Xn, Yn, Zn) where n=0 to 4, may be generated by Mathematica, using the Fit(data, {1, x, x^2, ..., x^n}, x) function or other suitable software packages capable of performing curve fitting regression.

Step four is the final step in the calibration process of FIG. 11, process 606, and results in storing the coefficients in the liquid crystal control system which is now described.

The coefficients that profile the liquid crystal characteristics may be stored in microcontroller 402 memory (FIG. 12) by flashing the memory of the microcontroller with the appropriate 15 coefficient values.

The thermal compensation system of the present invention operates by reading the temperature of the liquid crystal cell and adjusting the voltage drive of the cell based on the cell state. The cell state may typically be OFF, ON or operate in a variable mode. The cell state may be stored in the microcontroller 402 and also be configured via the host computer 400.

Microcontroller may be a PIC microchip having an internal analog digital converter and operating with a 10 Mhz crystal oscillator 404 clock. The microcontroller may be programmed to cycle through all pixels in the cell to controllably apply voltage to each pixel. The microcontroller may be connected to a multi-channel digital analog converter (DAC) configured to provide an output voltage level in response to a configuration pulse stream from the microcontroller over a serial interface. The output of the DAC connects to the input of an analog switch array having switching element 414$^n$ associated with each pixel in the cell. Each element in the switch array 414 preferably shares a 1.2 khz clock provided by an output port pin of the microcontroller.

Other drive frequencies may be used to actuate the liquid crystal material. In addition, A frequency modulated drive may be incorporated into the platform to replace the amplitude modulated voltage drive. Such FM drive may also be optimized using the same methodology as described later in the thermal compensation calibration and operation loops.

With respect to the continuing example and for any given pixel, DATA is passed to the DAC along with a SELECT pulse train encoding the appropriate voltage amplitude at the Nth output channel. A WR command sent to the DAC causes the DAC output to be received at the input of the Nth analog switch 414$^n$, triggering the application of an AM transmission over a 1.2 khz carrier to be applied to the appropriate liquid crystal cell electrode 500$^N$. As the microcontroller cycles through each iteration of the process steps described above, N is incremented and the voltage is applied the next pixel in the system.

A temperature sensor reading may be provided by the internal integrated heater/temperature sensor from an external device. One of the heater/temperature sensor electrodes 502 or 502' of the liquid crystal cell 100 may be grounded while the other may connect to switch 407. Switch 407 may selectively engage the integrated heater/temperature sensor element 108 in a sense or heat mode. More specifically, switch 407 may be configured ON to connect the ungrounded heater/temperature electrode through instrumentation amplifier 406 to an ADC coupled to the microcontroller which reads the temperature on the liquid crystal cell, or it may be configured OFF so that power amplifier FET 410, which may be controlled by a pulse train from microcontroller 402 and applies a voltage potential to operate the device 108 as a heater.

In a temperature sense feedback closed loop operation, which shall hereby be referred to as the loop embraced by process steps 607 through 609 of FIG. 11, the microcontroller reads the temperature of the liquid crystal cell and calculates the voltage drive based on the sensed temperature, T, and the current state of each pixel, Theta. The fifteen coefficients are plugged back into the fourth order regression formula to establish a smooth surface profile delineating an optimal voltage to supply to the pixel for a given temperature and pixel attenuation level:

$$v = (X + Y\theta + Z\theta^2) + (X_1 + Y_1\theta + Z_1\theta^2)T +$$
$$(X_2 + Y_2\theta + Z_2\theta^2)T^2 + (X_3 + Y_3\theta + Z_3\theta^2)T^3 + (X_4 + Y_4\theta + Z_4\theta^2)T^4$$

The new voltage value V is stored in the microcontroller for transmission to the DAC 412 during the next voltage application cycle.

The liquid crystal cell may also be maintained about a reference temperature. Process step 609 with respect to FIG. 11 involves the application of heat to maintain the temperature of the liquid crystal cell about a reference temperature. The reference temperature may be above the ambient room temperature or above the temperature of any carrier device that may be coupled to the LC cell. The selection of a reference temperature above the ambient temperature will result in the tendency of the LC cell to cool to meet the ambient temperature after the application of a heat burst. A counter thermal bias is therefore generated to support temperature stability about the reference temperature.

Microcontroller memory may store the reference temperature, the value of the current temperature, historical temperatures, and, historical levels of heat applied to the LC cell. The value of the sensed temperature T at every instance may be compared against the reference temperature to determine the amount of heat to apply to the liquid crystal cell. An 8 bit analog digital converter will provide approximately 1/3 of a degree of temperature sensing resolution over the desired temperature range, so the example system may provide for temperature stability about a reference temperature to within 1/3 degree Celsius. At every instance of process step 609, a threshold detector routine stored in microcontroller ROM may trigger a control function if the sensed temperature of the liquid crystal cell falls below the desired operating reference temperature. The control function may determine how much heat to apply to the liquid crystal cell. The control function may utilize error minimizing routines that track the change in temperature across multiple instances of process step 609. The error correcting routines may store the previous temperature reading T0 along with the previous amount of heat applied to the liquid crystal cell H0. The temperature reading and every succeeding temperature reading T1 may be compared against T0 to determine the amount of temperature change resulting from the previous heating of the liquid crystal cell. Heat may be applied to the liquid crystal cell by way of the FET power driver as described above. The heater may be triggered at a fixed or variable duty cycle and controlled using frequency or amplitude modulation.

Although the present invention has been fully described by way of description and accompanying drawings, it is to be noted that various changes and modifications will be apparent to those skilled in the art. For example, various patterns may be used to form the spacer element, metal gasket and integrated heater/temperature sensor elements of the multi-pixel cell platform. Use of external temperature sensors and heaters in part or whole may be applied using the temperature compensation methods and regression of the present invention. The conductive electrode layer 104 may be transparent or reflective, depending on the application and pixel type. The metal gasket may be modulated to provide heating function in addition to its function as a moisture barrier support membrane. Epoxy gaskets may be used in combination with metal gasket elements in part or whole, and the metal gasket elements may comprise a single solder cap. Anchoring and aligning the liquid crystal material in a cell may also be performed using photo alignment material, Staralign by Vantio of Switzerland or or other known alignment methods, including laser etching. Anchoring the liquid crystal material in the cell (described hereunder as step five) may be performed before patterning of the polyimide (described hereunder as step four). The process steps for the closed loop temperature feedback may also be rearranged such that the heating process is performed prior to applying the voltage drive. The order of fitting voltage with each dimension of the three dimensional surface is reversible and other three dimensional surface fitting algorithms may be used, including but not limited to those that describe a surface with one dimension fitting a fourth degree polynomial and the other dimension fitting a second degree polynomial. Amplitude or frequency modulation may be used to drive the liquid crystal cell. An electrically conductive nanostructure grating optical element can be disposed on the inside surface of substrate 110A or 110B to provide the optical function and further eliminate the need for the alignment layer and/or electrode layers that are otherwise applied to the surface of substrates 110A and 110B. It is well within the scope of the present invention to make modifications to the electrode masks to produce any size array of liquid crystal cells in any first, second or third dimension. Finally, it is well within the scope of the present invention to change the electrode masks accordingly to modify the shape of each pixel.

Therefore, it is to be noted that various changes and modifications from those abstractions defined herein, unless otherwise stated or departing from the scope of the present invention, should be construed as being included therein and captured hereunder with respect to the claims.

The invention claimed is:

1. A multi-pixel liquid crystal cell platform, comprising:
   A first substrate having a first electrode layer patterned with multiple pixels, and a first alignment layer,
   a second substrate placed in opposition to the first substrate and having a second electrode and second alignment layer,
   liquid crystals coupled between the first and second substrates,
   a spacer element coupled between the first and second substrates,
   A metal gasket element bonded to the first and second substrates,
   wherein at least one pixel is a photovoltaic tap pixel.

2. A multi-pixel liquid crystal cell platform, comprising:
   A first substrate having a first electrode layer patterned with multiple pixels, and a first alignment layer,
   a second substrate placed in opposition to the first substrate and having a second electrode and second alignment layer,
   liquid crystals coupled between the first and second substrates,
   a spacer element coupled between the first and second substrates, A metal gasket element bonded to the first and second substrates, wherein at least one pixel is a polarization beam splitter/combiner pixel capable of functioning as a polarization independent variable optical attenuator.

3. A multi-pixel liquid crystal cell platform, comprising:

A first substrate having a first electrode layer patterned with multiple pixels, and a first alignment layer, a second substrate placed in opposition to the first substrate and having a second electrode and second alignment layer, liquid crystals coupled between the first and second substrates, a spacer element coupled between the first and second substrates, A metal gasket element bonded to the first and second substrates, wherein at least one pixel is a Faraday rotator pixel capable of functioning as a polarization dependent variable optical attenuator with integrated isolator.

4. A multi-pixel liquid crystal cell platform, comprising:

A first substrate having a first electrode layer patterned with multiple pixels, and a first alignment layer, a second substrate placed in opposition to the first substrate and having a second electrode and second alignment layer, liquid crystals coupled between the first and second substrates, a spacer element coupled between the first and second substrates, A metal gasket element bonded to the first and second substrates, wherein the first or second substrate further includes a sub wavelength optical element or nanostructure grating, wherein the sub wavelength optical element is configured to operate in a capacity selected from the group consisting of polarization rotation, polarization filtration, beam splitting, polarization beam splitting, polarization beam combining, and waveguide.

5. A multi-pixel liquid crystal cell platform, comprising:

A first substrate having a first electrode layer patterned with multiple pixels, and a first alignment layer, a second substrate placed in opposition to the first substrate and having a second electrode and second alignment layer, liquid crystals coupled between the first and second substrates, a spacer element coupled between the first and second substrates, A metal gasket element bonded to the first and second substrates, An active thermal element disposed between the first and second substrates, further including a microcontroller that reads the temperature value of the cell and computes the temperature compensated voltage drive based on a stored regression profile of the cell operating characteristics across voltage.

6. A multi-pixel liquid crystal cell platform, comprising:

A first substrate having a first electrode layer patterned with multiple pixels, and a first alignment layer, a second substrate placed in opposition to the first substrate and having a second electrode and second alignment layer, liquid crystals coupled between the first and second substrates, a spacer element coupled between the first and second substrates, A metal gasket element bonded to the first and second substrates, An active thermal element disposed between the first and second substrates, and at least one VIA formed between the metal gasket element and first or second electrode.

7. A multi-pixel liquid crystal cell platform, comprising:

A first substrate having a first electrode layer patterned with multiple pixels, and a first alignment layer, a second substrate placed in opposition to the first substrate and having a second electrode and second alignment layer, liquid crystals coupled between the first and second substrates, a spacer element coupled between the first and second substrates, A metal gasket element bonded to the first and second substrates An active thermal element disposed between the first and second substrates, and at least one VIA formed between the active thermal element and the metal gasket element.

* * * * *